United States Patent
Frietas et al.

(10) Patent No.: US 7,092,998 B2
(45) Date of Patent: Aug. 15, 2006

(54) SOFTWARE ARCHITECTURE FOR WIRELESS DATA AND METHOD OF OPERATION THEREOF

(75) Inventors: Nathanial X. Frietas, Brooklyn, NY (US); Shane Connely, Hoboken, NJ (US); Will Meyer, New York, NY (US); Jonathan Oakes, New York, NY (US); James Venturi, New York, NY (US)

(73) Assignee: Palm, Inc., Sunnyvale, CA (US)

( * ) Notice: Subject to any disclaimer, the term of this patent is extended or adjusted under 35 U.S.C. 154(b) by 444 days.

(21) Appl. No.: 09/759,204

(22) Filed: Jan. 16, 2001

(65) Prior Publication Data

US 2002/0049858 A1   Apr. 25, 2002

Related U.S. Application Data

(60) Provisional application No. 60/286,637, filed on Jun. 6, 2000, provisional application No. 60/176,014, filed on Jan. 14, 2000.

(51) Int. Cl.
  *G06F 15/16* (2006.01)
  *H04M 11/00* (2006.01)

(52) U.S. Cl. .............. 709/217; 709/218; 709/219; 709/246; 709/203; 379/93.15

(58) Field of Classification Search ............... 709/217, 709/219, 246, 220, 200, 218, 203, 206; 379/100.08, 379/100.13, 93.15, 93.24
See application file for complete search history.

(56) References Cited

U.S. PATENT DOCUMENTS

| | | | | |
|---|---|---|---|---|
| 5,758,088 | A | | 5/1998 | Bezaire et al. ......... 395/200.62 |
| 5,872,926 | A | * | 2/1999 | Levac et al. ................. 709/206 |
| 6,107,944 | A | | 8/2000 | Behr et al. ................... 340/995 |
| 6,151,628 | A | | 11/2000 | Xu et al. ..................... 709/225 |
| 6,167,426 | A | | 12/2000 | Payne et al. ................. 709/200 |
| 6,167,441 | A | * | 12/2000 | Himmel ...................... 709/217 |
| 6,393,569 | B1 | * | 5/2002 | Orenshteyn ................. 713/201 |
| 2002/0002596 | A1 | * | 1/2002 | Sugiarto et al. ............. 709/218 |

OTHER PUBLICATIONS

International Search Report PCT/US01/00946.

* cited by examiner

*Primary Examiner*—Anthony Knight
*Assistant Examiner*—Thomas Pham
(74) *Attorney, Agent, or Firm*—Shemwell Mahamedi LLP

(57) ABSTRACT

A software architecture, data model, and access protocol to facilitate real time, session-based access to server-based data from low bandwidth wireless computing devices.

22 Claims, 27 Drawing Sheets

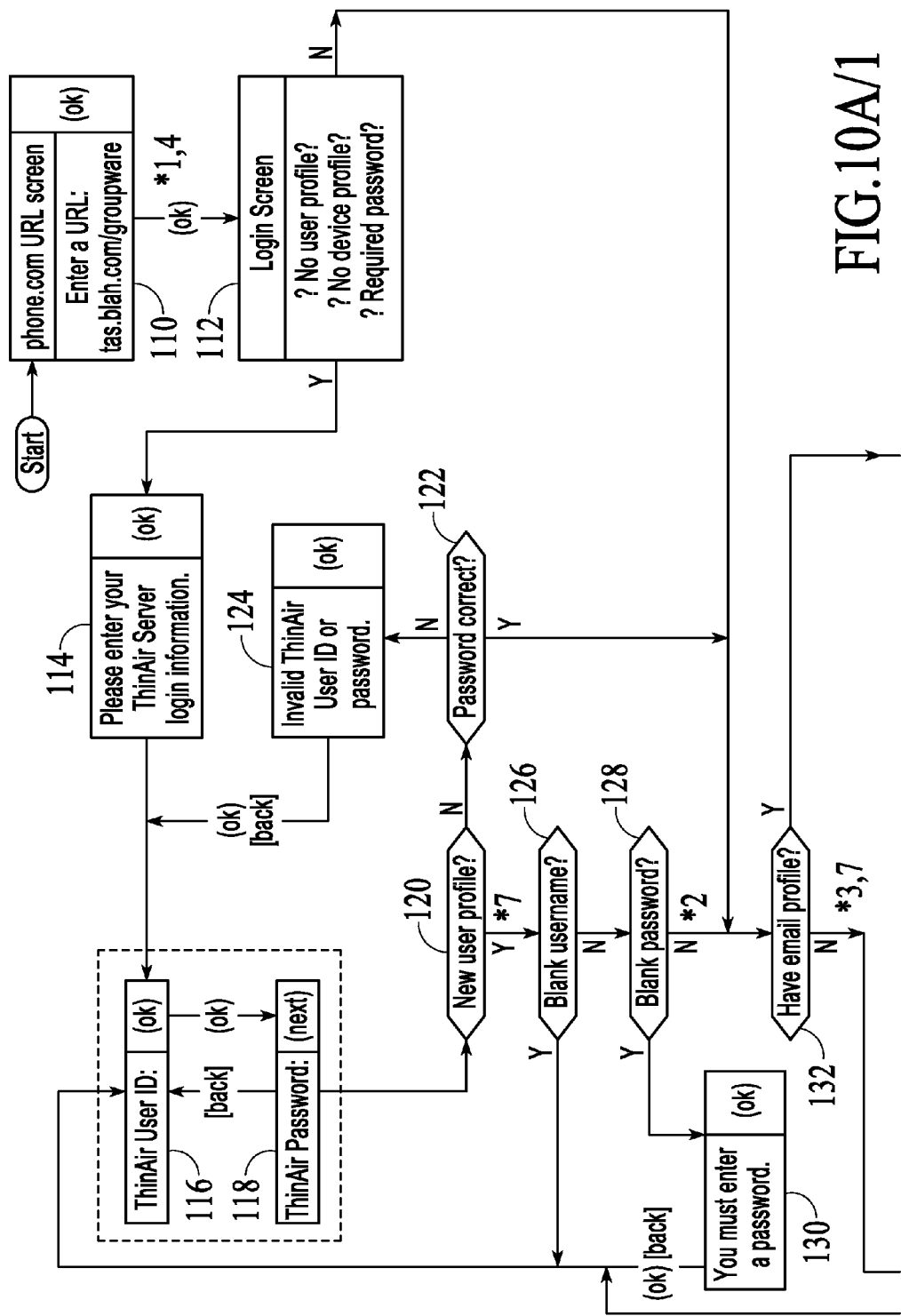
FIG.10A/1

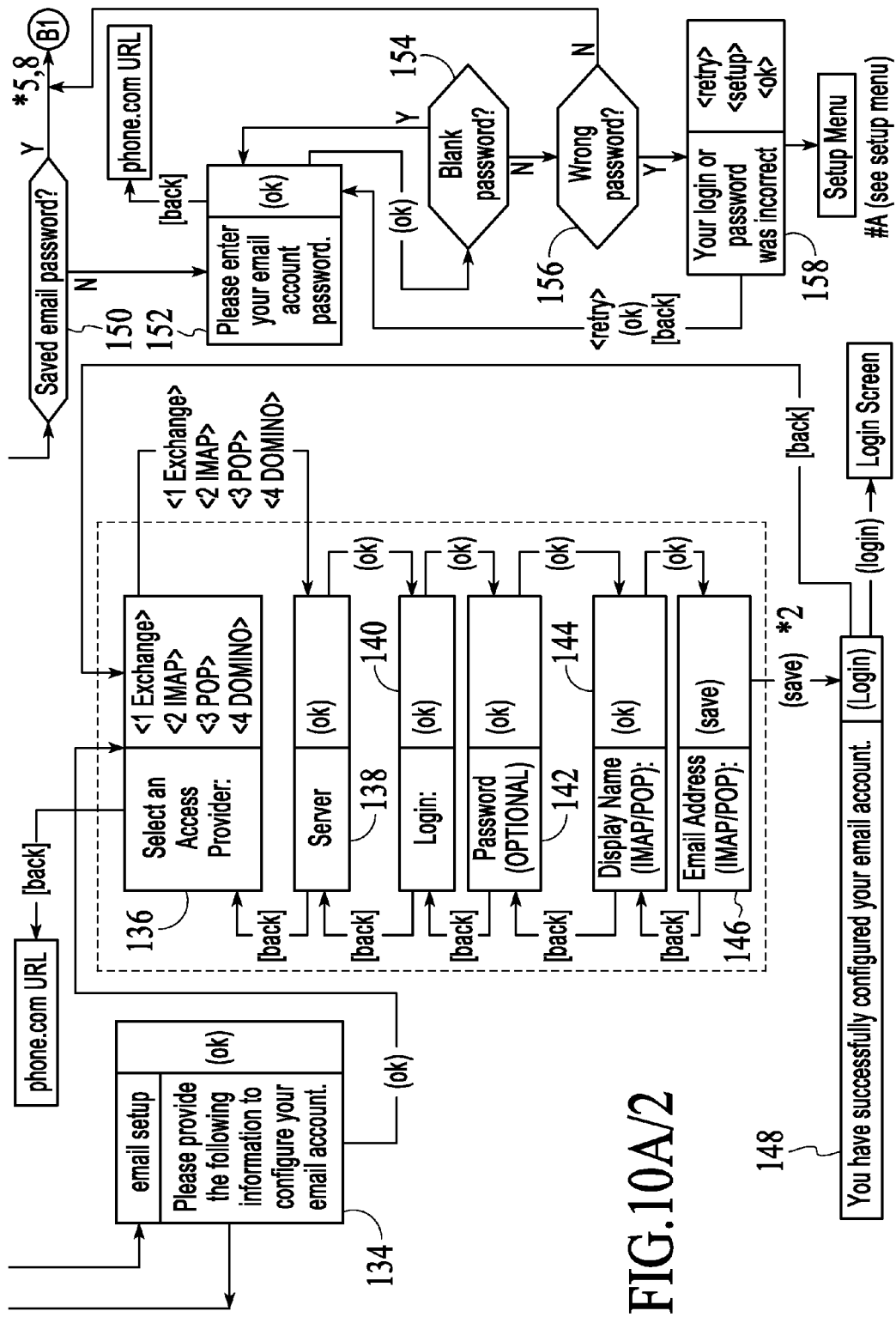
FIG.10A/2

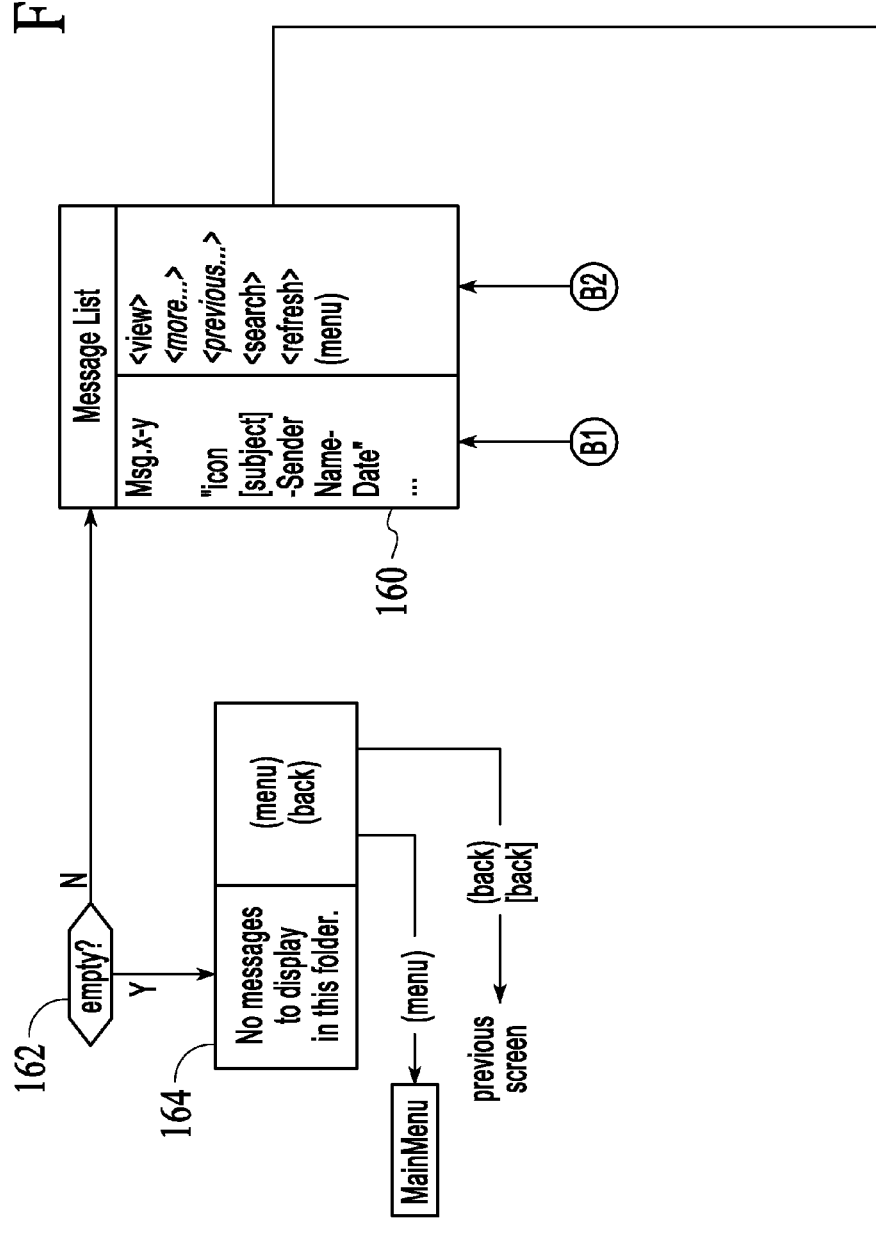
FIG.10B/1

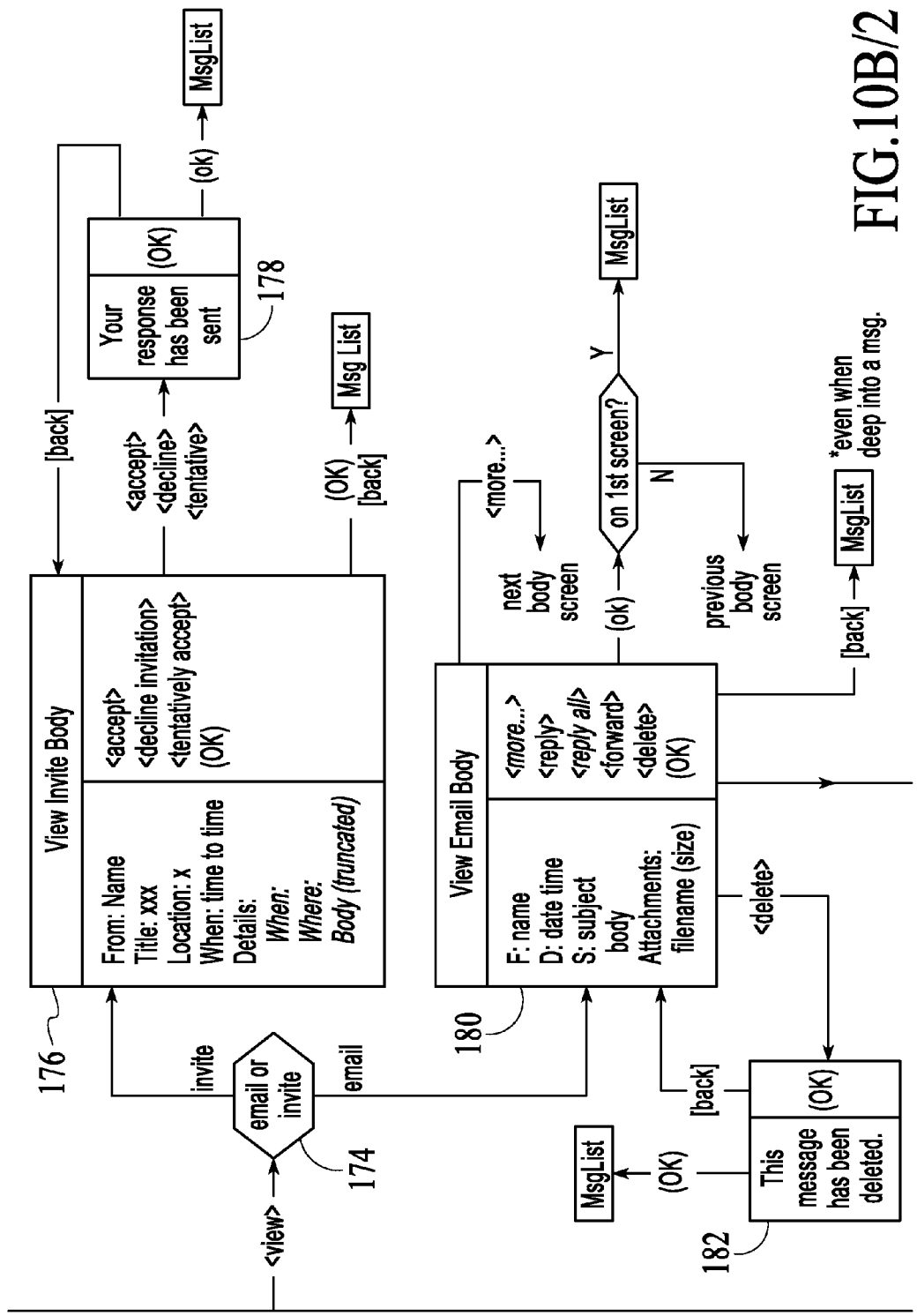
FIG.10B/2

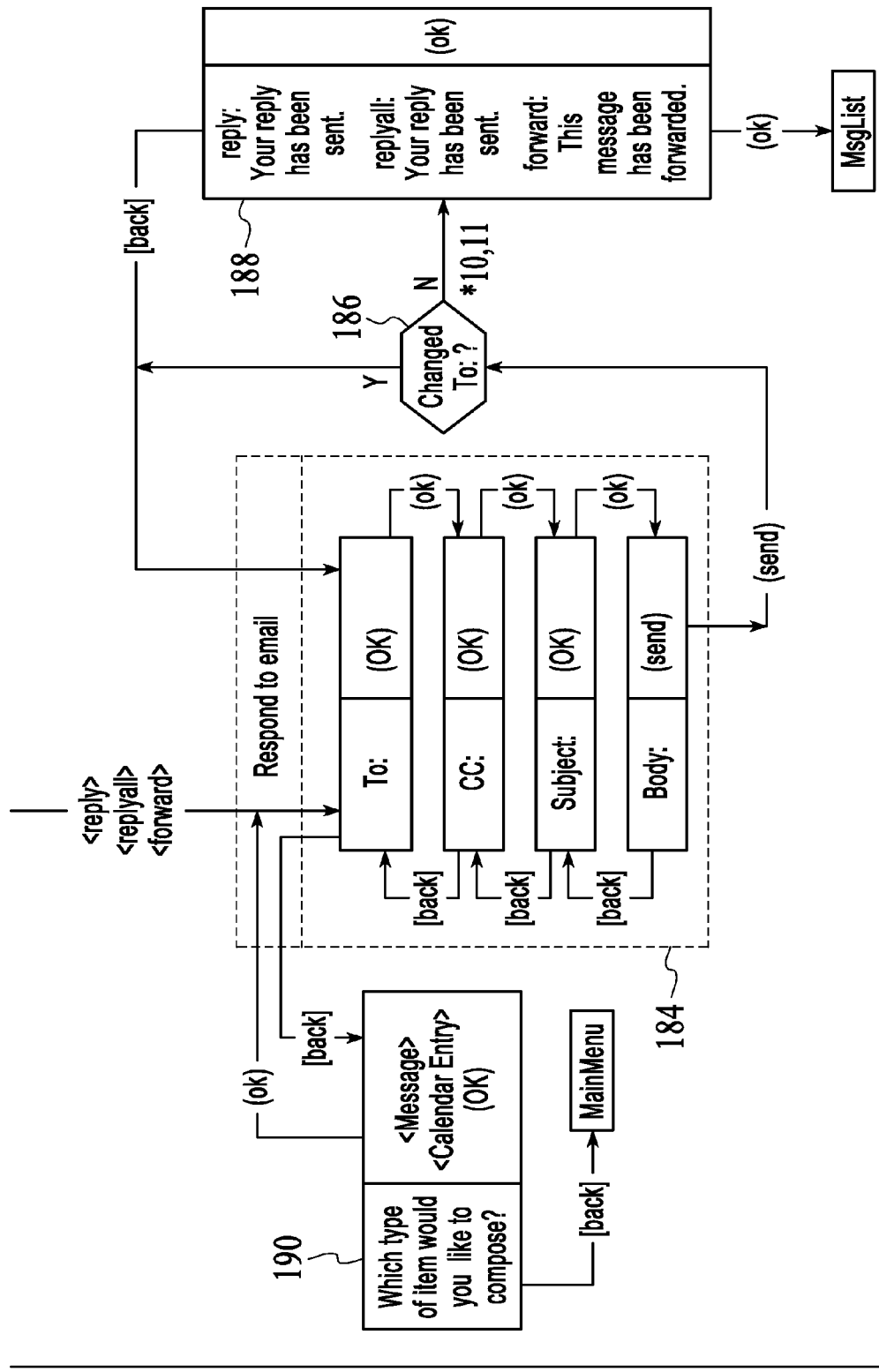
FIG.10B/3

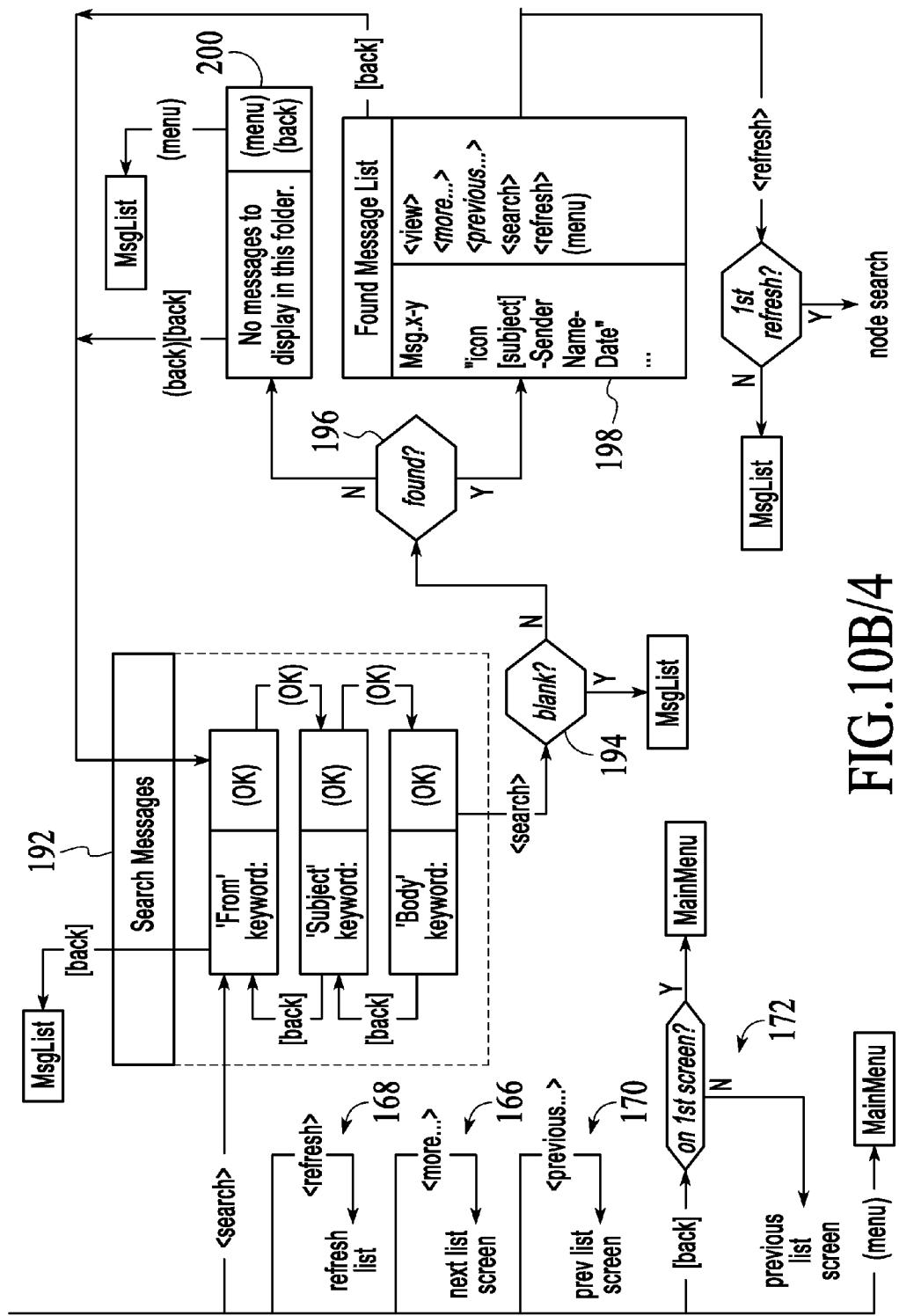
FIG.10B/4

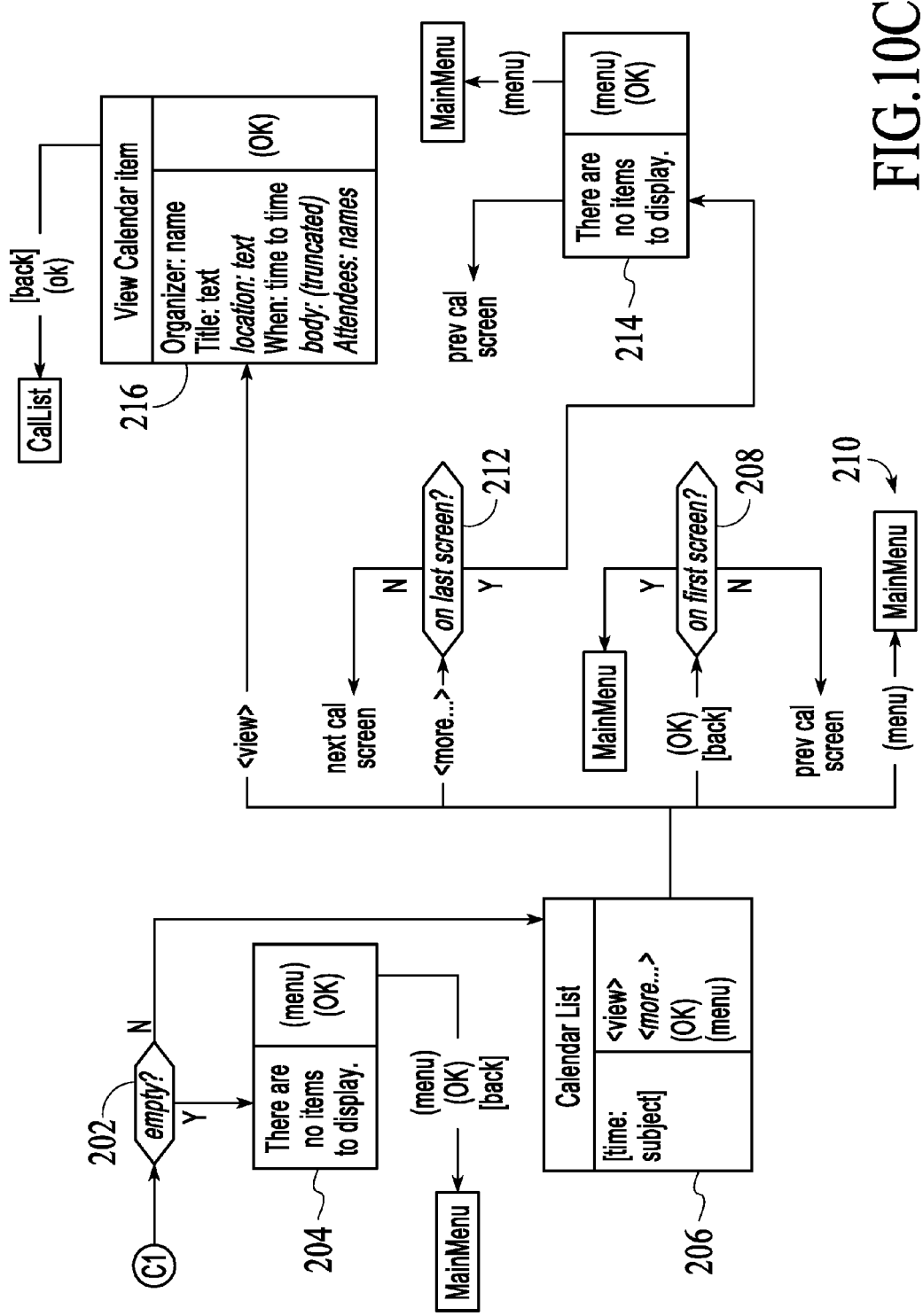
FIG.10C/1

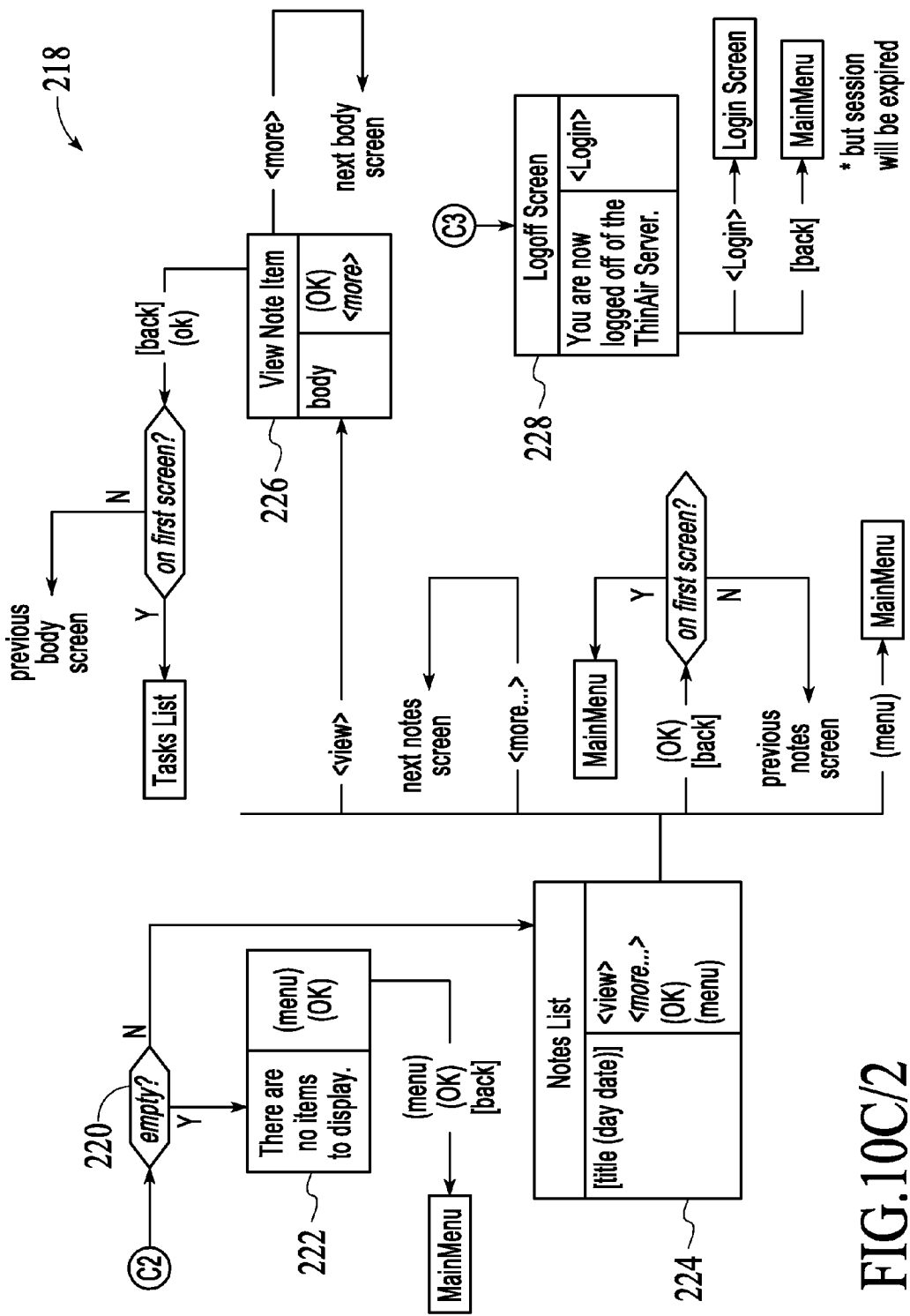
FIG. 10C/2

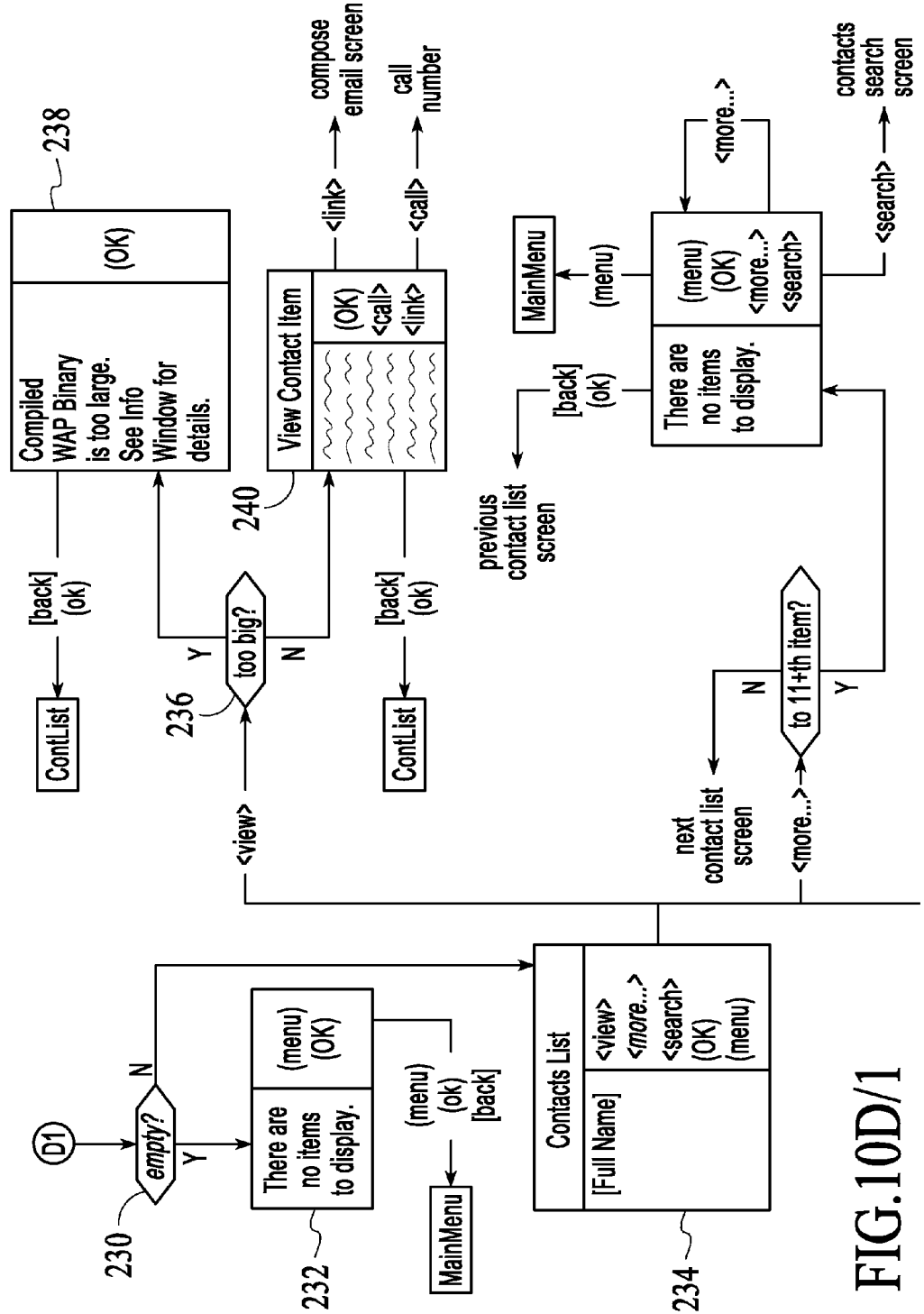
FIG.10D/1

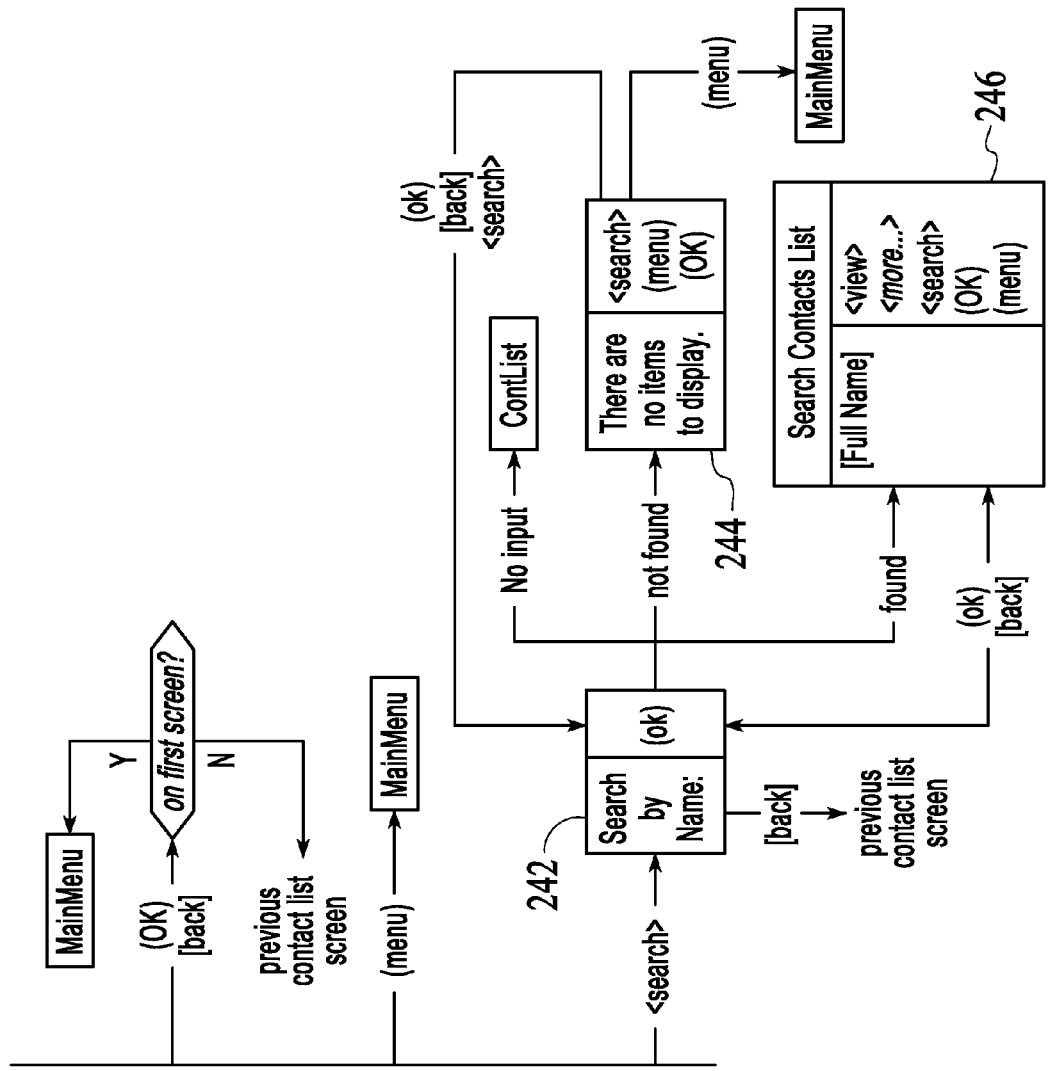
FIG.10D/2

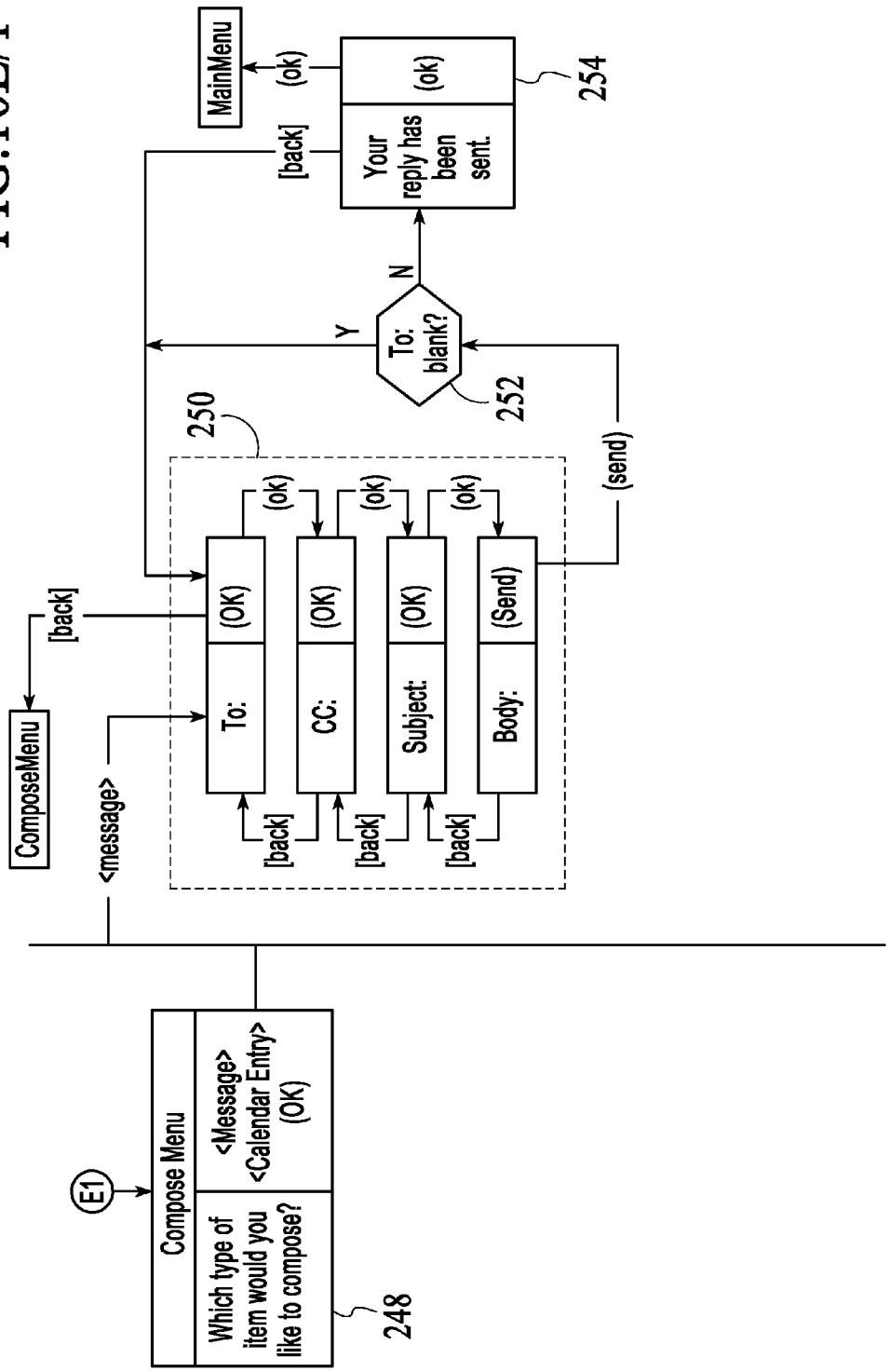
FIG.10E/1

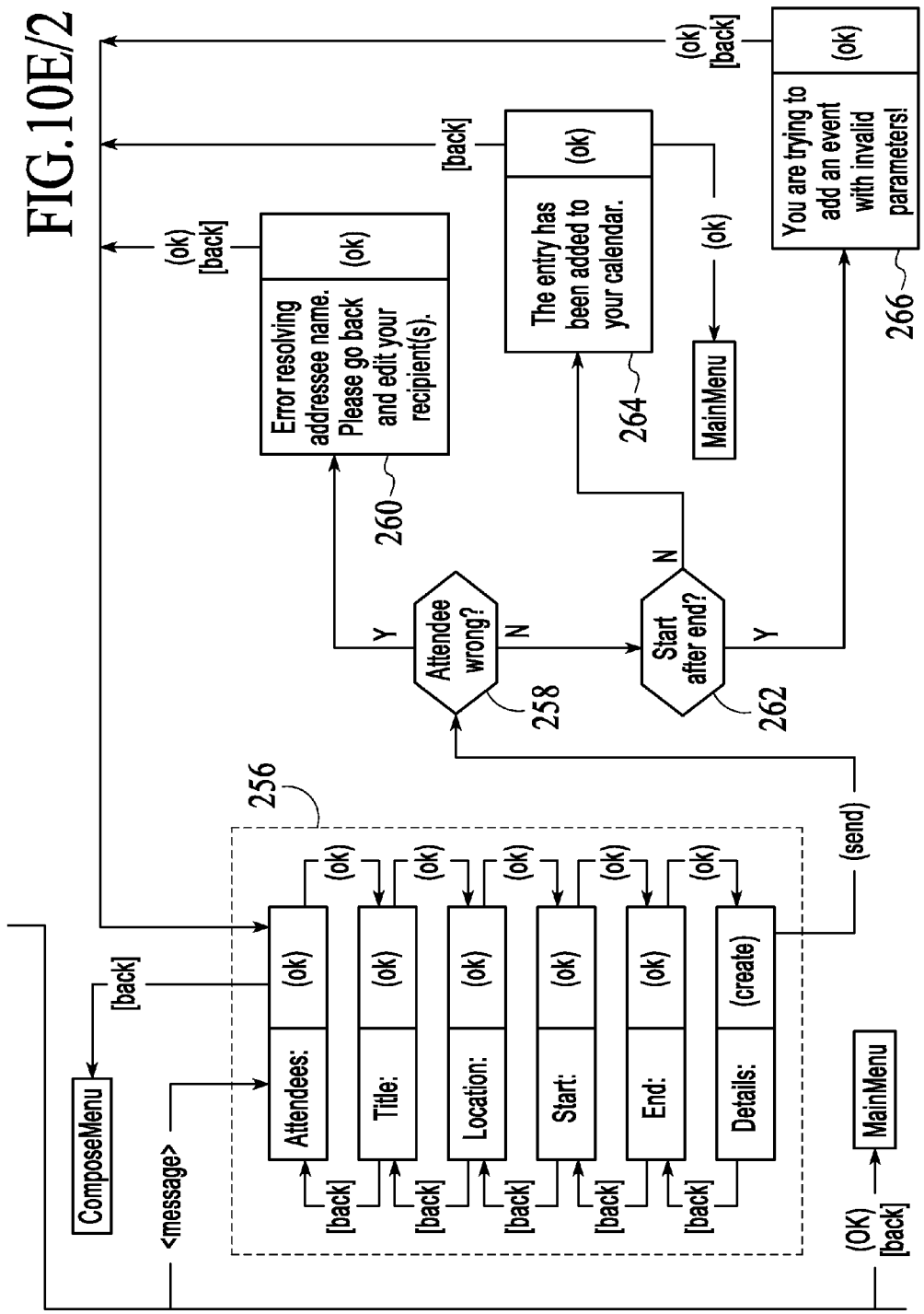
FIG.10E/2

```
EXCEPTIONS for TAS1.1.16####
01. Network not available.
--> TAServer down.

02. The ThinAir Server is being actively configured by an
administrator. Please try accessing it again later.
--> User Manager in use and in active mode.

03. No email access providers are currently available.
Consult your ThinAir administrator or try again later.
--> provider down.

04. HTTP Error: 404.
--> missing "/groupware."

05. The ThinAir Provider could not be found. Please check
your account settings.
--> provider down.

06. Your session has expired. Please login again.
--> Provider down after login.
--> Inactivity after login.

07. You do not have the proper permissions.
--> can't create new users
--> can't use users with no device profile.

08. ThinAir Server was unable to process your request.
<setup>
--> provider goes down abnormally and user tries to login.

10. The server could not be found. Please check your
account settings.
--> smtp host not found.

11. ThinAir Server could not connect to the specified host.
Please check your settings and try again.
--> smtp service not running on host.
```

FIG.10F/1

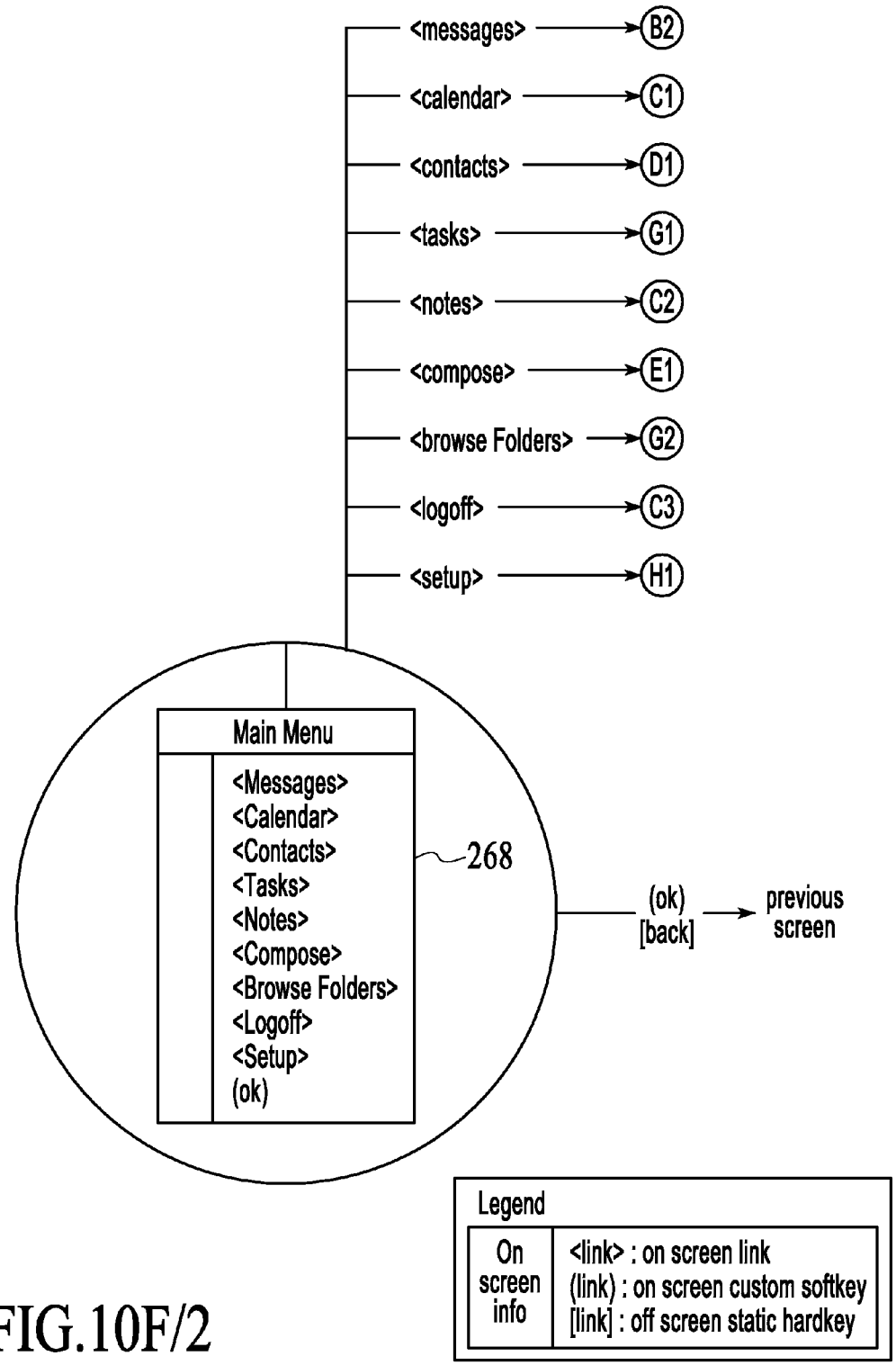
FIG.10F/2

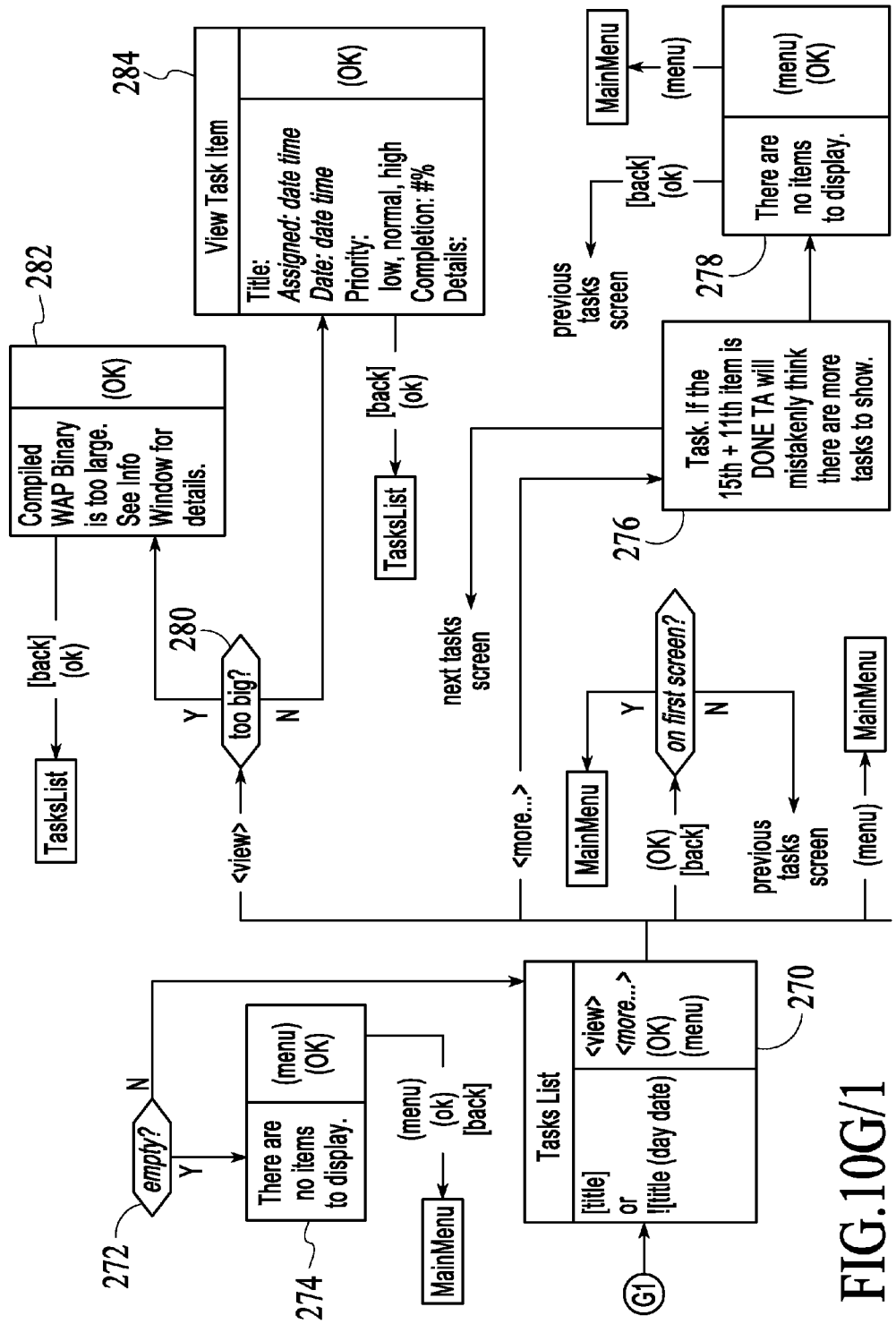
FIG.10G/1

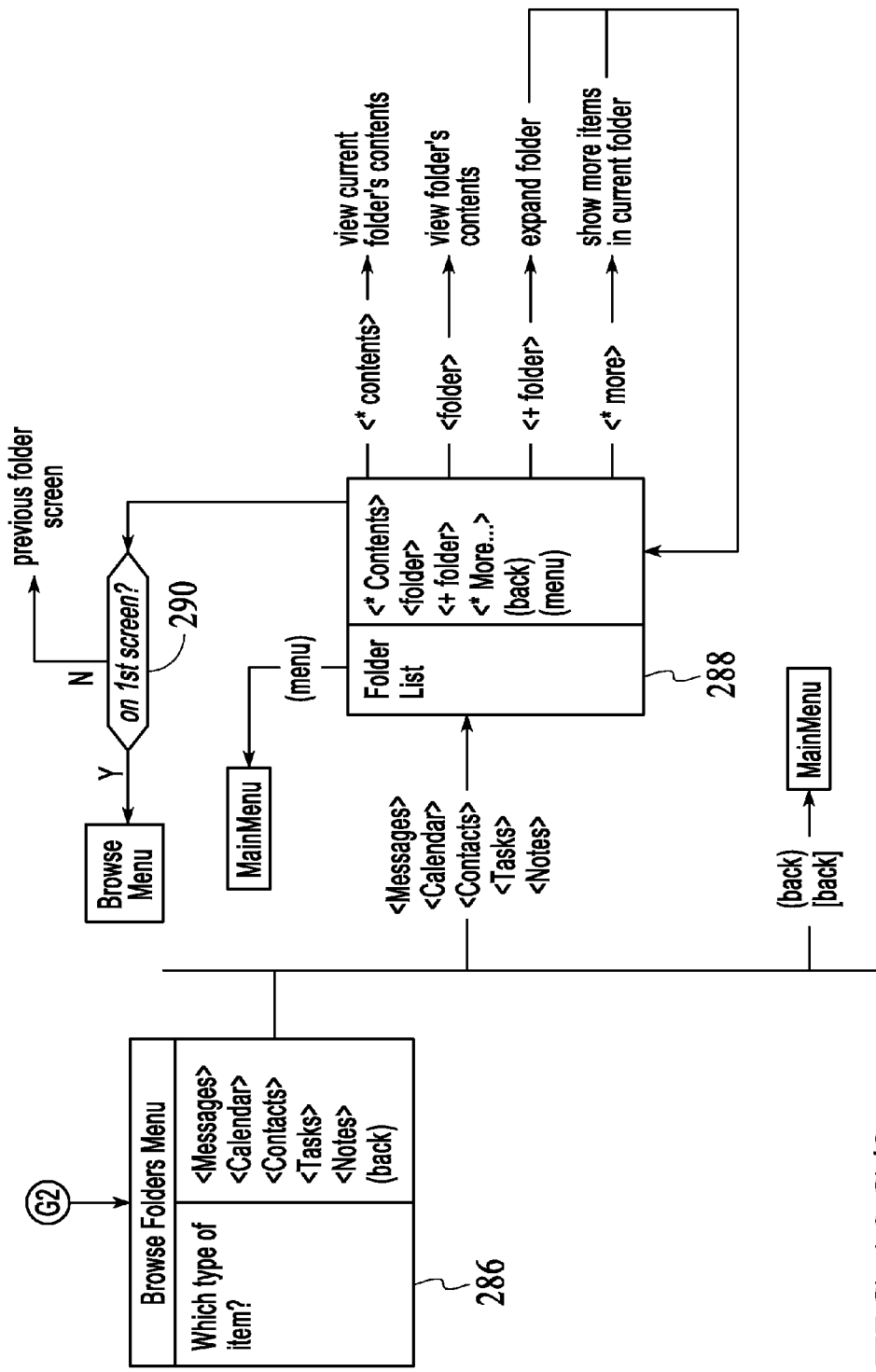
FIG.10G/2

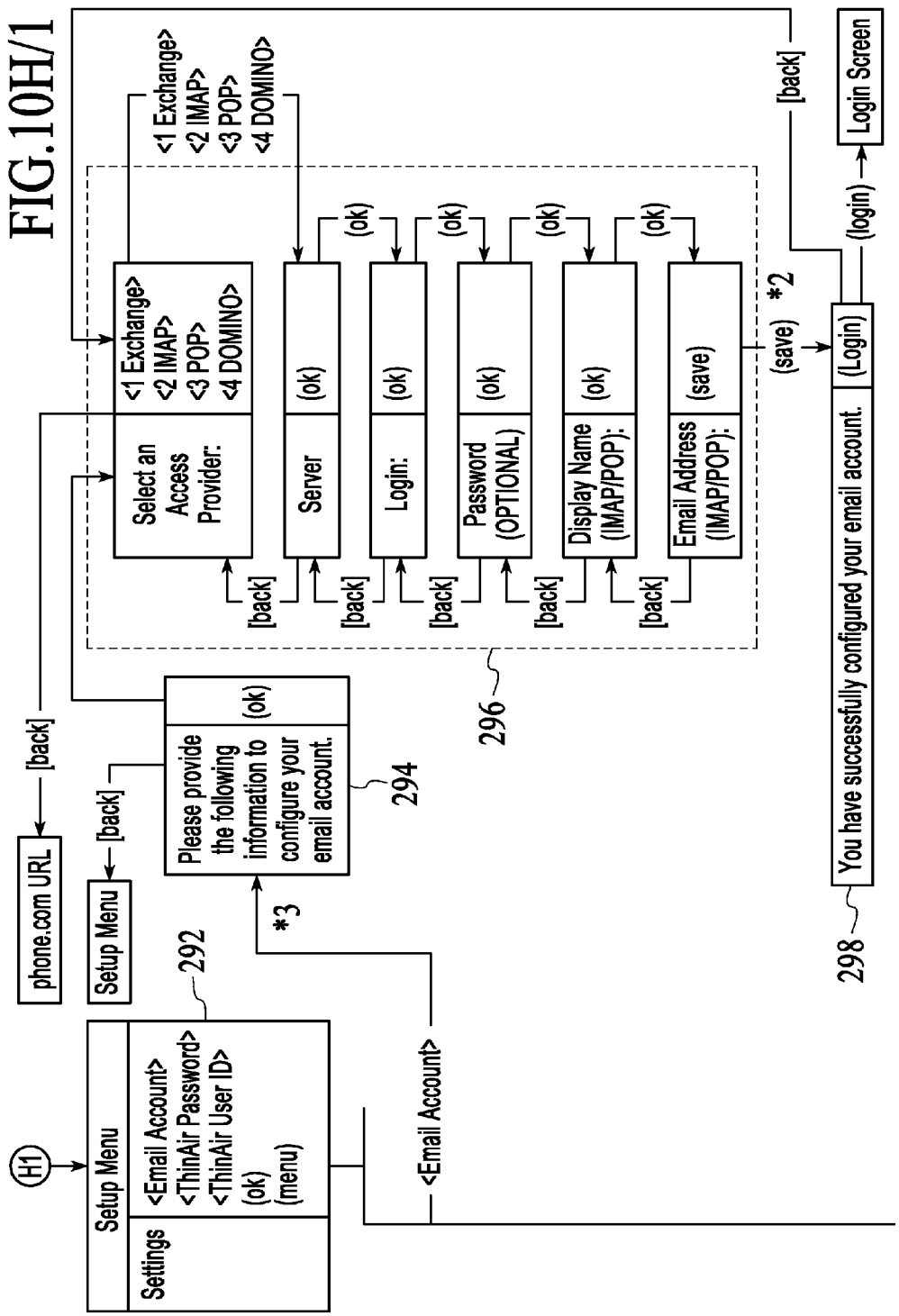

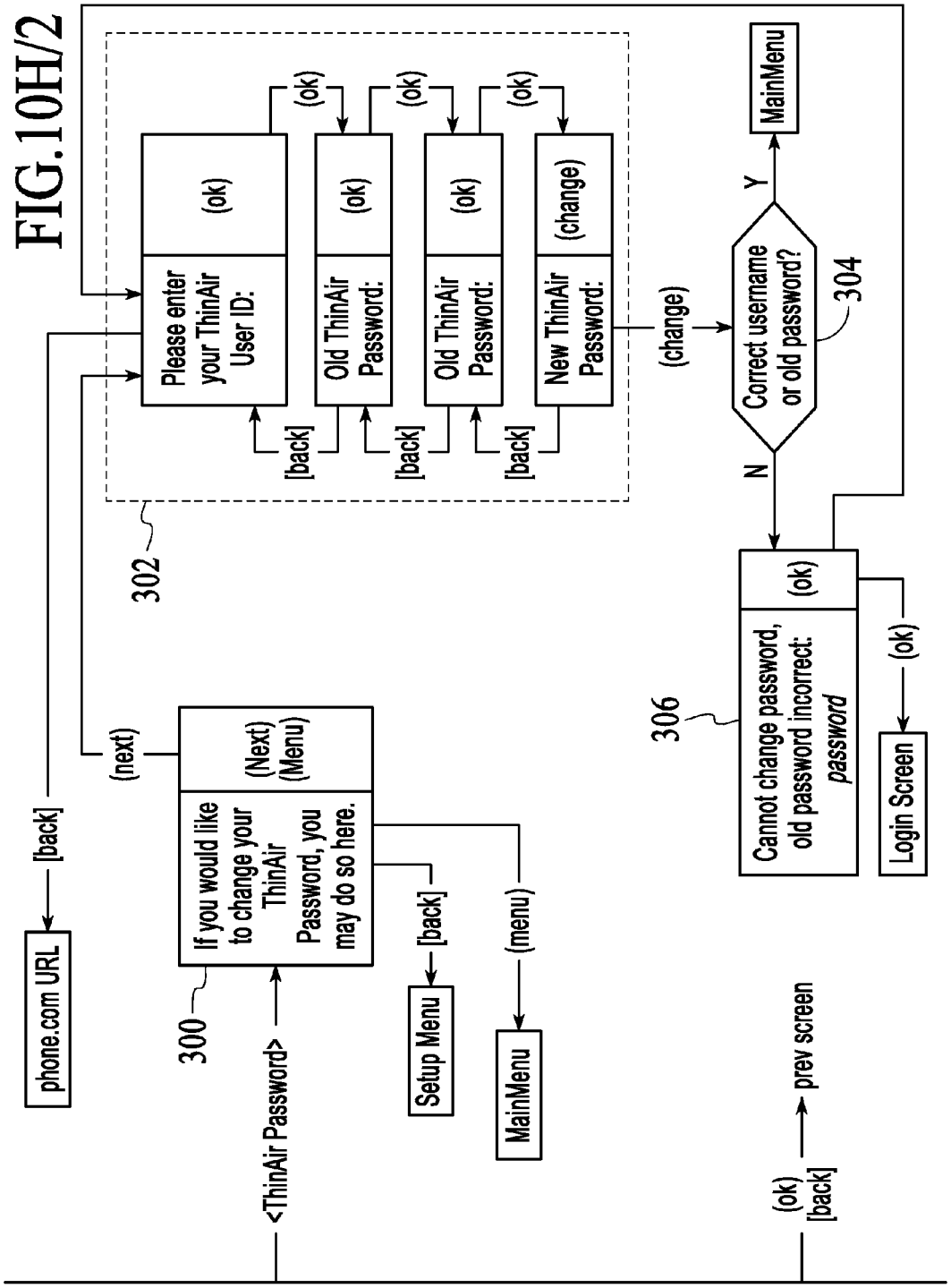

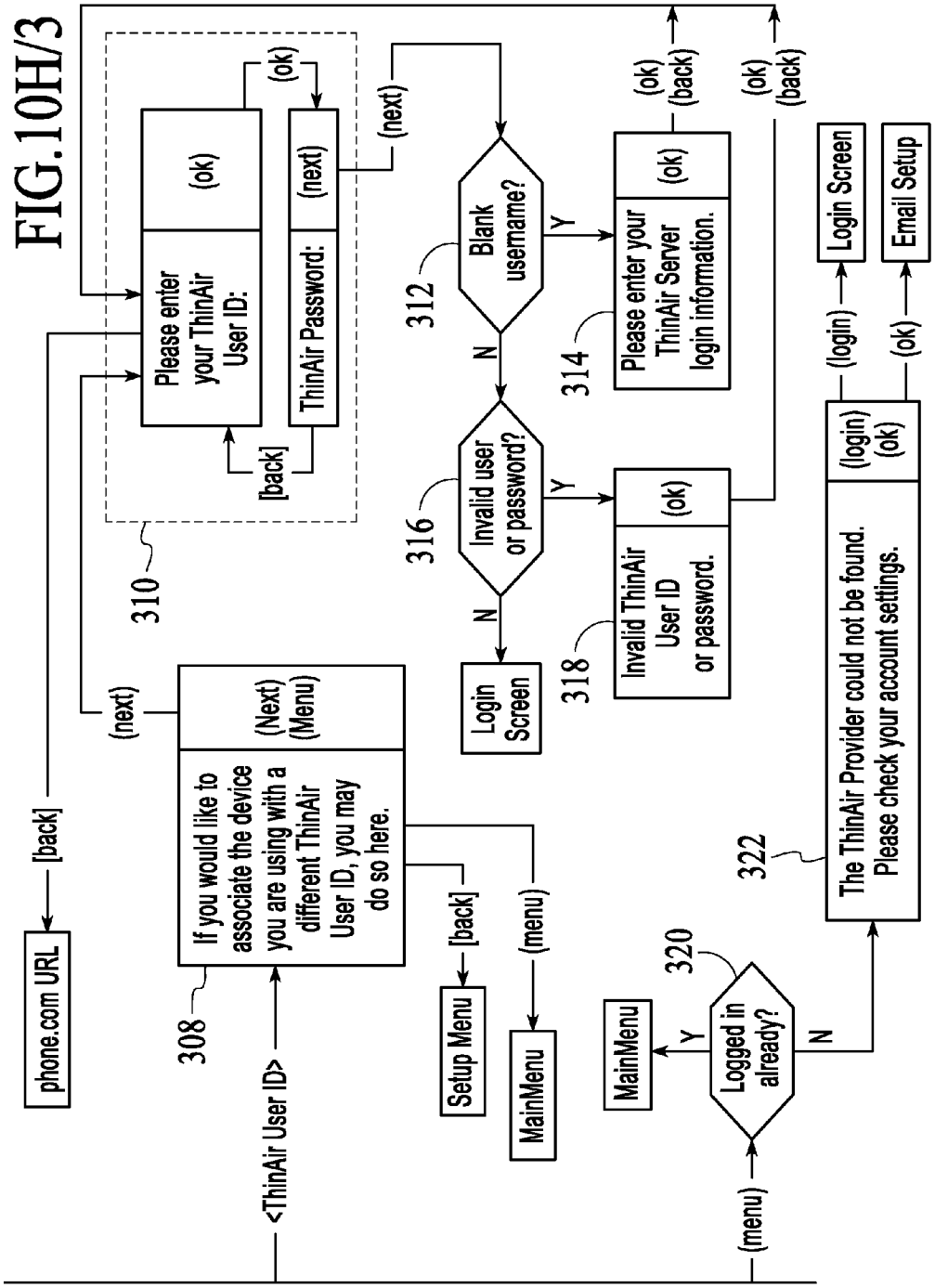

SOFTWARE ARCHITECTURE FOR WIRELESS DATA AND METHOD OF OPERATION THEREOF

PRIORITY

The following application claims priority from U.S. Provisional Patent Application Ser. No. 60/176,014, filed Jan. 14, 2000, and this application also claims priority from the U.S. Provisional Patent Application Ser. No. 60/286,637, filed Jun. 6, 2000.

FIELD OF THE INVENTION

The present invention relates to a system and method for accessing server-based software applications remotely. More particularly, the present invention relates to a software architecture, data model, and access protocol to facilitate real-time, session-based access to server-based data from low-bandwidth wireless computing devices.

BACKGROUND OF THE INVENTION

The proliferation of low cost mobile computing devices with wireless capabilities has created a demand for software systems that support their capabilities. The variety of devices and methods for accessing remote servers also demands server software that is flexible in the manner which it communicates and formats its responses. Some devices expect browser-targeted markup languages, such as HTML (HyperText Markup Language) or WML (Wireless Markup Language). Other devices, which can support more complex, custom client applications, can support more complex data formats. Ultimately, new devices are being developed and distributed to the general public everyday, making the openness and flexibility of a software system which supports them even more critical.

For a software system of this type to be useful, a core application which makes use of its capabilities for remote access from any device to any data is necessary. Perhaps no type of data is more time sensitive and essential to the modern worker than what is commonly referred to as groupware. Groupware includes essentially any application or application-suite that offers collections of canonical item-types, such as messages, contacts, events, and tasks, and exposes query-able interfaces to those collections. For example, Microsoft's Outlook® client and Microsoft Exchange Server® allow a user to store contacts in an address book, send e-mail to those contacts, schedule a meeting based on the results of e-mail, and create a list of tasks necessary to prepare for some milestone.

Indeed, getting e-mail to handheld devices has been a problem in need of a better solution than is currently available. Previous methods of synching information between wireless devices and servers have been laden with shortcomings. From resolving conflicting data, to not having up-to-date information, to not receiving urgent information quickly enough, mobile workers have been saddled with numerous inadequate choices due to synching technology. Particularly troublesome for users that were searching for an e-mail solution that did not rely on synching was the fact that most e-mail-enabled wireless devices have had their own separate e-mail address and inbox. Autoforwarding has therefore been the only way for a user to access e-mail sent to their primary inbox. This has been a poor solution to a complex problem.

A need therefore exists for a software architecture, data model, and access protocol for wireless devices which utilizes low bandwidth, high latency, wireless networks to facilitate access to highly complex and dense remote servers on demand, in real-time. For a system which includes these components to be useful and applicable, a core "killer" application is required. The invention described by this document satisfies both of these needs.

SUMMARY OF THE INVENTION

The present invention satisfies the foregoing need by providing, in one aspect, a method of communicating wireless data wherein a request is generated at a wireless device. The type of wireless device which generated the request is detected and the request is routed to a server through a software module which implements the functionality of a particular application for the wireless device type. The request is then processed at the server and a response to the request is generated.

In another aspect of the invention a software architecture for wireless data is provided. The software architecture includes a wireless data receiving and transmitting device application and a server for processing requests from said wireless device application. A software module running on the server detects the type of wireless device and routes the request from the wireless device application to the server through a software module implementing the functionality of a particular application for the wireless device type.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIGS. 10A–10H is a flowchart of a wireless groupware application in accordance with a preferred embodiment of the present invention.

DETAILED DESCRIPTION OF PREFERRED EMBODIMENTS OF THE INVENTION

Figure 1:
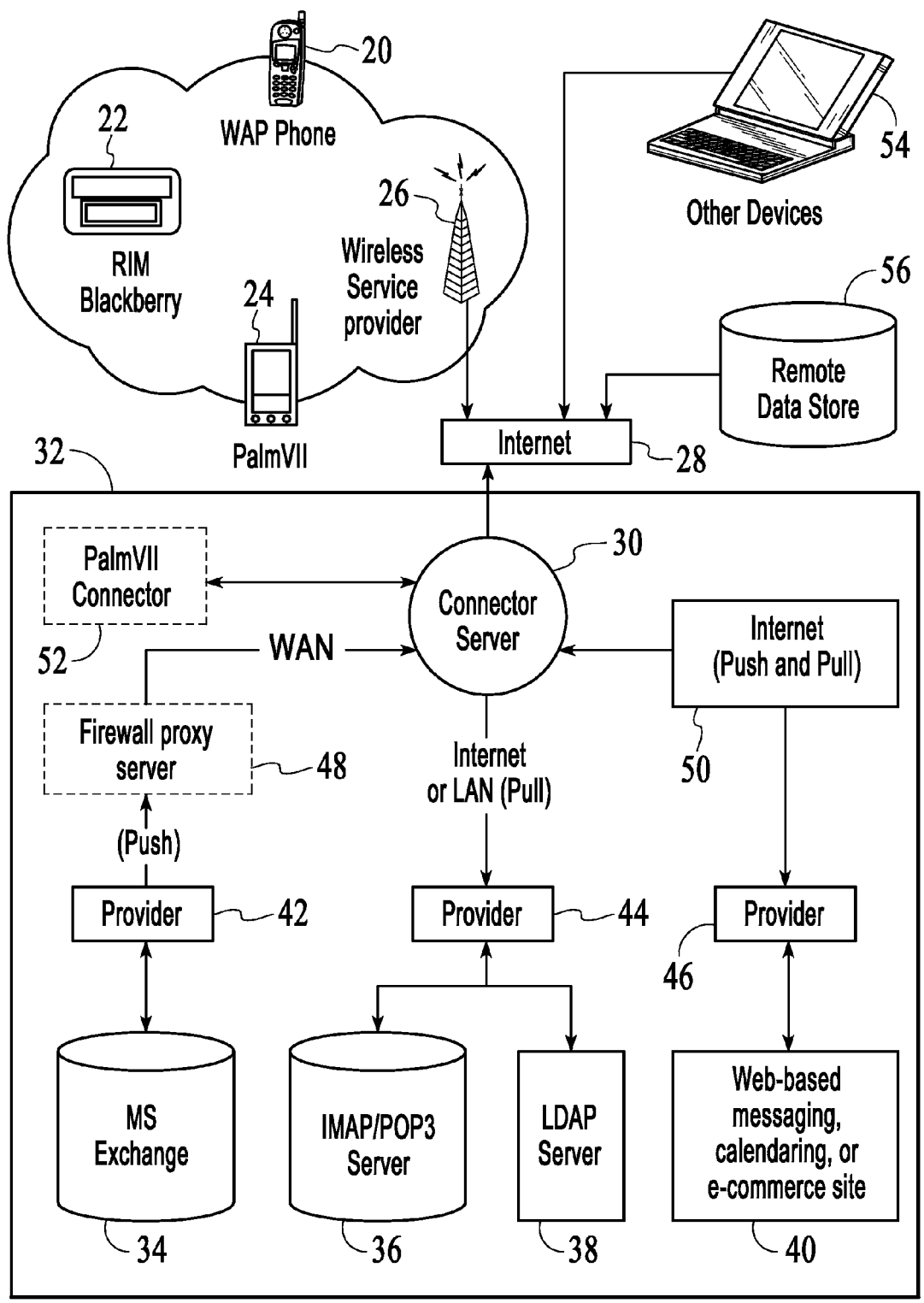
FIG. 1 is a block diagram representation of a system in accordance with a preferred embodiment of the present invention.
Figure 2:
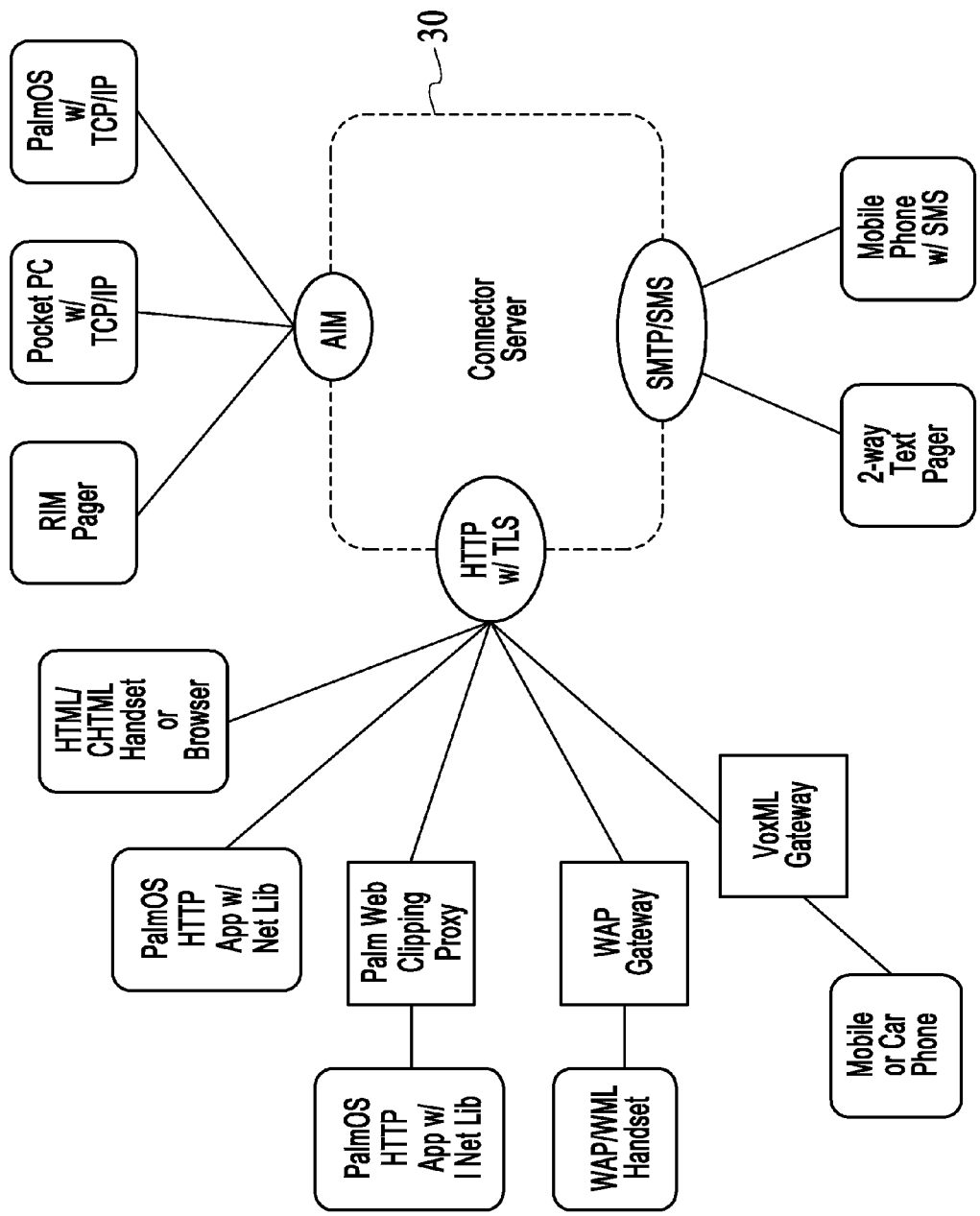
FIG. 2 is a block diagram representation of protocols, gateways, and devices that can be linked using the software architecture of the present invention.

Referring now to the figures wherein like reference numerals indicate like elements, in FIG. 1 there is a shown a block diagram representation of a system in accordance with a preferred embodiment of the present invention. In the exemplary embodiment depicted, the system includes Client devices, e.g., WAP phone 20, RIM Blackberry pager 22, and Palm VII 24, which link through a wireless service provider 26 to the Internet 28 to a Connector server 30. As shown in FIG. 2, any other small footprint, low power regardless of the gateway, e.g., VoxML, WAP, etc., or protocol, e.g., HTTP, AIM, SMTP, SMS, etc., can also be supported by the system. Referring back to FIG. 1, the Connector server 30 acts as a secure access point from the outside world into a network 32. In the preferred embodiment, it is envisioned that the network 32 will be a mid- or large-size corporate, i.e., "enterprise," network.

As used herein, server refers to a software application running on a hardware computing server, hosting one or more wireless applications. Wireless encompasses communication technology, both software and hardware, which enables access by mobile computing devices to remote data without the direct use of fixed, physical wired infrastructure. The complete chain of wireless communication usually, but not necessarily, includes a number of gateways, base stations, receivers, and antennas. Communication may also take place over public or private networks using a variety of frequencies and protocols for data transmission. In a preferred embodiment, the Connector server 30 is a Pentium II class or Unix equivalent server with 128MB RAM, Windows NT, Linux, Solaris or other Java 1.1 enabled operating software.

The data stores 34–40 are connected to Providers 42–44 which provide an access point into the data stores. These Providers 42–44 can be located in the same LAN as the Connector server 30, on a WAN, or anywhere on the Internet. This distributed approach to Provider availability allows them to reside behind firewalls 48 if needed. Providers can also push data out through an HTTP proxy server 50 if that is the only connection to the outside world available to users. Providers 42–46 manage access to their assigned data store implementation and update the Connector server 30 with status information periodically during runtime and during shutdown. As depicted, the system may also include one or more Client specific Connectors 52 to provide device specific application logic and response formatting. Examples of Client devices supported by Connectors 52 include Palm VII organizers, Palm III/V organizers with wireless connectivity, RIM Inter@ctive pagers, WAP-enabled handsets (WML 1.1), HDML-enabled cell phones (HDML 3.0), and Windows CE devices with wireless connectivity.

The Connectors 52 are dynamically loaded modules of the Connector Server 30 that implement the functionality of a particular application for some set of devices. A Connector 52 resembles a Java Servlet in form and function. Connectors are supported by the Connector Access class which provides standard service such as Session Management, User Management, and Logging.

A Connector 52 handles requests from wireless devices and generates responses. In some cases, there may be only one Connector for an entire application that may be responsible for servicing requests from several types of devices. Alternatively, there may be one Connector for each device type that an application supports. The device-specific Connectors can share the core functionality that makes up the application logic.

Figure 3:
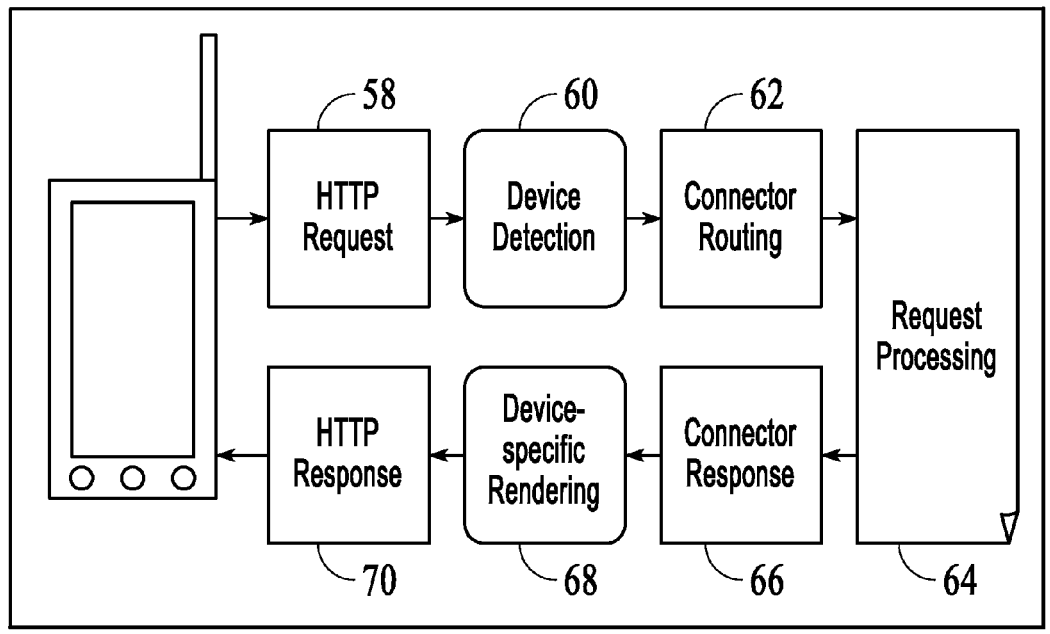
FIG. 3 is a flowchart representing the request handling process of the system of the present invention.

As shown in the exemplary embodiment of FIG. 3, an HTTP request 58 is transmitted from a wireless device to a Connector. A device detection process 60 is undertaken to determine the type of wireless device from which the HTTP request 58 emanates. After determining the type of wireless device, the HTTP request is routed through the appropriate connector 62 to the Connector Server where the request is processed 64. A response to the request is then generated and routed back to the appropriate connector 66. The response is then rendered 68 for the specific type of wireless device and an HTTP response 70 is transmitted back to the wireless device.

The Connector(s) 52 may be modularized further by moving the data-access functionality of the application into separate Provider components. The Connector Server application framework makes Providers available to Connectors, whether they are running locally on the server machine or even across a network. Since the communication between components is transparent both to the components and to the developer, a distributed architecture can be easily introduced for an application as the deployment scales.

Wireless Device Detection and Profiling

Figure 4:
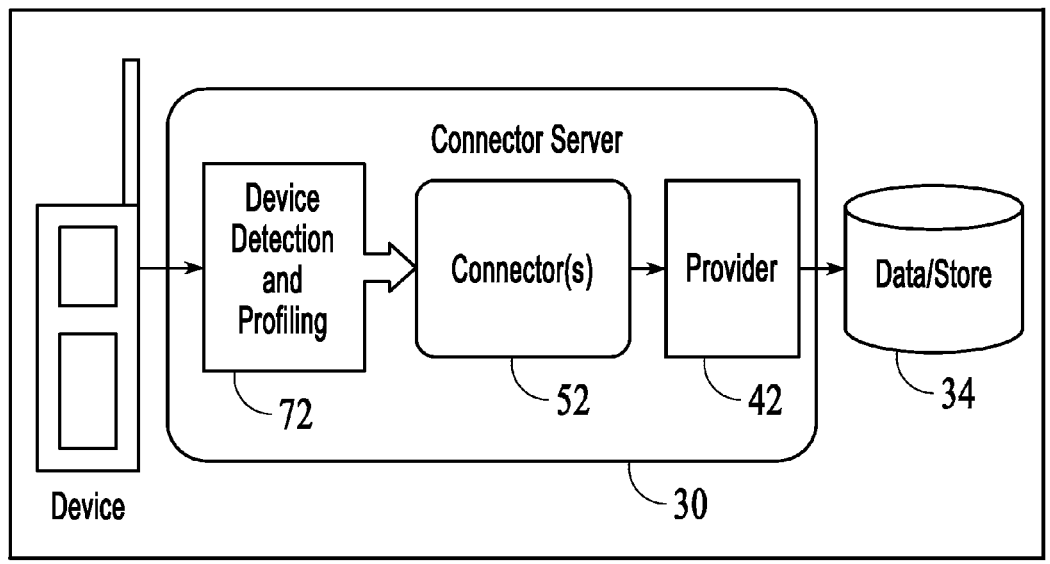
FIG. 4 is a flowchart representing the wireless device recognition process.

When a Connector 52 receives a request from a device, the Connector Server 30 invokes the Connector's handle method 72, FIG. 4, which informs it of the request and passes the necessary input for processing. Device objects are an abstraction of the actual physical devices that issue HTTP requests to the server. The Connector Server's ability to automatically recognize the properties of any device that contacts it plays an important role in tracking which devices a user possesses, and in enabling a Connector 52 to generate output custom tailored for different wireless devices, and the networks and client applications which they make use of.

A Device Profile represents a template or prototype for a particular class of physical devices (which may or may not be wireless). Device class membership may be determined by the manufacturer of the device, the markup language browser(s) installed on the device, or some combination of these factors. Devices within a class share some set of well-defined properties, embodied in the Device Profile. A Connector can programmatically query all Device objects generated by this profile for information such as:
The height and width of the screen in pixels
The number of soft keys
Whether or not the device has a color screen The actual values of these properties will differ from Device to Device, just as they differ among actual physical devices. Some models of wireless phones supporting the UP Browser may have screens with ten lines of text while others may only support three. When the Connector Server 30 receives an HTTP request, it queries each of its installed DeviceProfiles (in a configurable order) for the first one that matches the request. The chosen DeviceProfile then acts as a factory, generating a Device instance, and mapping the attributes of the physical device to the Device object's member data fields.

When the Connector Server 30 routes a request to your Connector, it constructs a Device object whose properties correspond to those of the physical device. For example, if a user makes a request from a WAP handset with a Phone.com WML Browser, the object passed as a parameter to handlewill be of type UPWAPDevice. The example below illustrates how to use the Java instance of operator to conditionally render output (to the Connector Server console) based on the type of device making the request:

```
public void handle(Properties req, Device device, OutputStream out)
{
if (device instanceof UPWAPDevice) {
   System.out.println ("A handset with UP.Browser");
}
else if (device instanceof NokiaWAPDevice) {
   System.out.println ("A Nokia handset of some sort");
}
else if (device instanceof WAPDevice) {
   System.out.println ("Some new or generic WAP device");
}
else if (device instanceof PalmVIIDevice) {
   System.out.println ("It's a Palm VII using a PQA");
}
else if (device instanceof HTMLDevice) {
   System.out.println ("At least it supports HTML!");
}
else {
   System.out.println ("An unknown device");
   }
}
```

Client and Server Security

Dependable security is of fundamental importance with accessing internal enterprise as well as personal data from remote clients. Toward achieving that end, all data sent across the network between the Connector Server and Providers is sent as compressed, serialized objects secured using standards-based encryption and authentication mechanisms. This approach is more secure than POP3, IIP, and FTP since an ASCII-based "clear text" protocol is not used. There is no way, for instance, for a user to manually "Telnet" into a Provider 42–46 or Connector Server 30 and interact with it. Data can also be encrypted at the device level and at the Connector server 30 so that at no point in the chain of communication between device and data store is data in an unencrypted form.

The network communication layers employ up-to-date encryption and authentication technologies. Communication between Client devices 20–24 and the Connector server 30 is performed using 40 or 128-bit Secure Socket Layer (SSL) wherever possible. Communications between Providers 42–46 and the Connector server 30 can also be encrypted using a variety of methods, including SSL and other Public key Infrastructure (PKI)-based systems.

The Connector server 30 facilitates access by the Client devices 20–24 to a host of data stores, e.g., Microsoft Exchange 34, IMAP/POP3 server 36, LDAP server 38, and web-based messaging, calendaring, or e-commerce site 40. The data stores 34–40 can also include lotus domino or any other open standards messaging, database, or other application.

Just as Providers 42–46 enable disparate data sources to interact with the Connector server 30, Connectors 52 handle the various protocols and peculiarities of wireless handheld devices supporting, in principle, even those devices that do not yet exist. Connectors 52 can also transform data store objects into HTML, XML, WML, or ASCII, or they can directly work with objects passed by Providers 42–46 to update information on other servers or databases. A connector 52 can also be used to link external applications and data sources to a Connector server 30.

Although primarily provided to support wireless Client devices 20–24, hardwired access devices 54, e.g., network terminals, can also access the data stores 34–40 through the Connector server 30 and Providers 42–46. Similarly, a Client device connected through a Connector 52 to the Connector Server 30 can access a remote data stores 56 utilizing the system.

Utilizing the foregoing system architecture users are able to access any type of data source via any type of Client device. To achieve that end, the component-based approach is employed and implemented with configurable software modules that are designed to interface with Client devices 20–24 on the front-end and with enterprise data sources 34–40 on the back end. These modules plug in to the centralized Connector server 30 component that routes traffic between them. Since the modules can be installed and distributed separately from the core server platform, organizations have the option to distribute components across their network to ensure security and load balancing requirements.

The component-based architecture provides users with their choice of multiple scenarios for configuring the Connector server 30. A typical scenario involves having both the Connector server 30 and multiple Providers 42–46 installed within the corporation's LAN. One machine may host all of the components if desired, thereby eliminating the need for network communication between Providers 42–46 and the Connector server 30.

When installed on separate machines, both the Connector server 30 and Providers 42–46 employ a compressed, encrypted object transport layer to securely enable one of the true strengths of the system—distributed computing. Typically used as a catchall phrase for all sorts of client-server configurations, the Connector server model, with its single point of access from the Internet to multiple local/remote Providers that allow access to data store servers, is a practical and successful application of distribute computing. The model also allows for scalability and the ability to load balance across an array of servers by plugging in additional Providers where necessary.

When installed across separate machines, the Connector server-side architecture employs dynamic discovery mechanisms, allowing various components at different levels within the distributed architecture to inform each other of their availability and sets of services. Two primary levels of discovery occur: between Providers 34–40 and the Connector server 30, and between Client devices and the Connector 52. Examples of information conveyed during the process of discovery include the types of functionality offered by specific data store Providers 42–46, Provider status information, account information, and, in the case of "groupware," the range of item locations that specific Providers support.

Wireless Groupware Access Application

As used herein, groupware refers to a software application paradigm which facilitates collaboration and communication between a set of users. Each user has the ability to communicate, schedule, and organize private and public information. Commercial software packages that use this paradigm include Microsoft Exchange and Lotus Domino. Internet e-mail also fits within this model. Groupware, or portions of it, are also referred to as e-mail, PIM (personal information management), or shared calendaring. The architecture of a groupware product includes server software, or a "groupware store", which maintains and transports data, and client software, which allows the user to interact with the store to retrieve, view, create, update, and remove data from within the store.

The concept of "wireless groupware" is comprised of three components. First, a defined canonical format which represents a lightweight set of groupware store items and their essential fields and methods. Second, a lightweight, efficient communication protocol for authentication, and retrieval or manipulation of groupware objects in a server-side groupware store. Third, an application workflow/process which defines a real time wireless groupware session and application. These three components will be defined in the following sections.

Groupware Class Definition

This section will define the canonical format that has been created for representing groupware data within the wireless groupware system. The format was created to support the following:

- Compatibility with all existing groupware server store software
- Usage on limited resource mobile devices and high-powered servers alike
- Representation of only the most essential information in the most efficient manner possible
- Compatibility with all object-oriented computer programming languages The following chart provides the class definition of canonical groupware data types:

| CLASS NAME | DESCRIPTION |
|---|---|
| StoreItem | The core representation of an item within a groupware store. It contains an item's identifier string and location path. All other groupware item types extend this class. |
| Message | A representation of a message from one user to one or more other users. This is most commonly used for email messages, though instant messages, pages, announcements, or chat messages could also be represented by this class. Message has a number of subclasses including ForwardedMessage, ReplyMessage, EventInvitation, and TaskAssignment. |
| Event | A representation of an appointment, reminder, or meeting. The event has one organizer and one or more attendees. The class also contains the location, date, time, and description of the event. |
| Contact | A representation of an address book entry. The basic fields, such as name, phone number, and address, are represented, along with email and website addresses. |
| Task | A representation of an assigned task or "To Do" list entry. Notions of an assignee, completion amount and a deadline, or due date, are contained within this class. |
| Post | A representation of a bulletin board or newsgroup post. A post is from one user, and has no recipient. |
| GroupwareUserAddress | The basic representation of a user address within a groupware store. GroupwareUserSMTPAddress, an internet mail specific class, extends this class. |

The next chart provides class definitions of canonical groupware data actions:

| CLASS NAME(S) | DESCRIPTION |
|---|---|
| AddNewGroupwareItem | The basic "put" action for a groupware store. This represents actions such as composing mail, adding an entry to a date book, or adding a new person to an address book. |
| MoveGroupwareItem | The action for modifying the location of an item within a groupware store. This represents actions such as filing an email, moving an |

| CLASS NAME(S) | DESCRIPTION |
|---|---|
| | appointment to a shared group calendar, or organizing an address book into categories. |
| UpdateGroupwareItem | The action for modifying an existing item within a groupware store. This represents actions such as editing an email draft, changing the time of a meeting, or modifying the completion status of a task on a To Do list. |
| DeleteGroupwareItem | The action for removing an existing item from a groupware store. This represents actions such as deleting an email, canceling a meeting, or removing a post from a message board. |
| CountItems, CountItemsResponse | The action for obtaining a count of total items in a specified groupware store location. This is used to obtain status or overview information for the user. |
| MarkGroupwareItemSeen/Unseen | The action for changing the "viewed" status of an existing groupware store item. This represents messages and posts being marked read or unread. |
| ValidateName, ValidateNameResponse | The action for validating a GroupwareUserAddress against a groupware stores internal list of user addresses. This represents the ability to find a user in a directory when composing emails or event invitations. |

Figure 5:
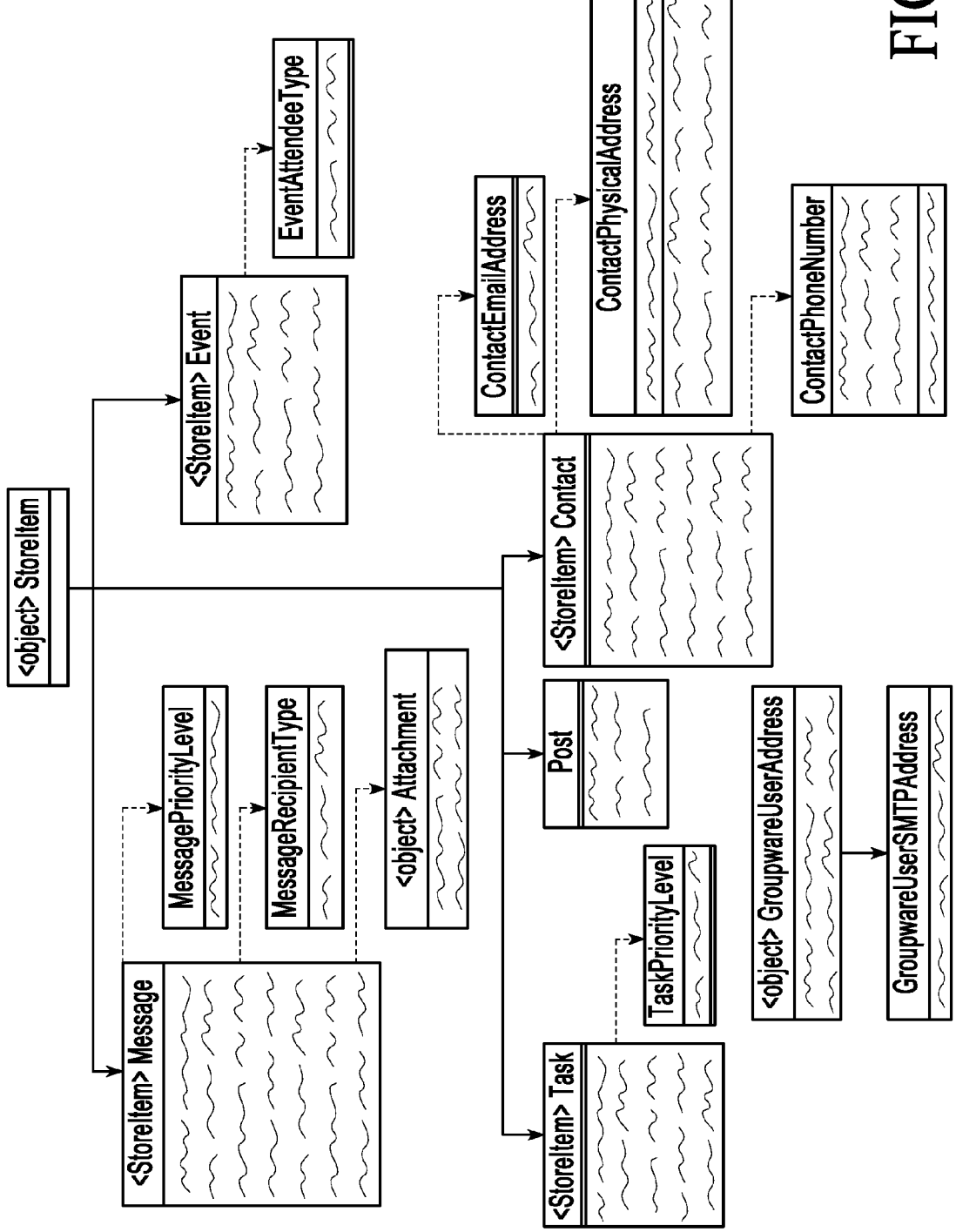
FIG. 5 is a UML diagram of the core classes in a preferred embodiment of the wireless groupware system of a preferred embodiment of the present invention.
Figure 6:
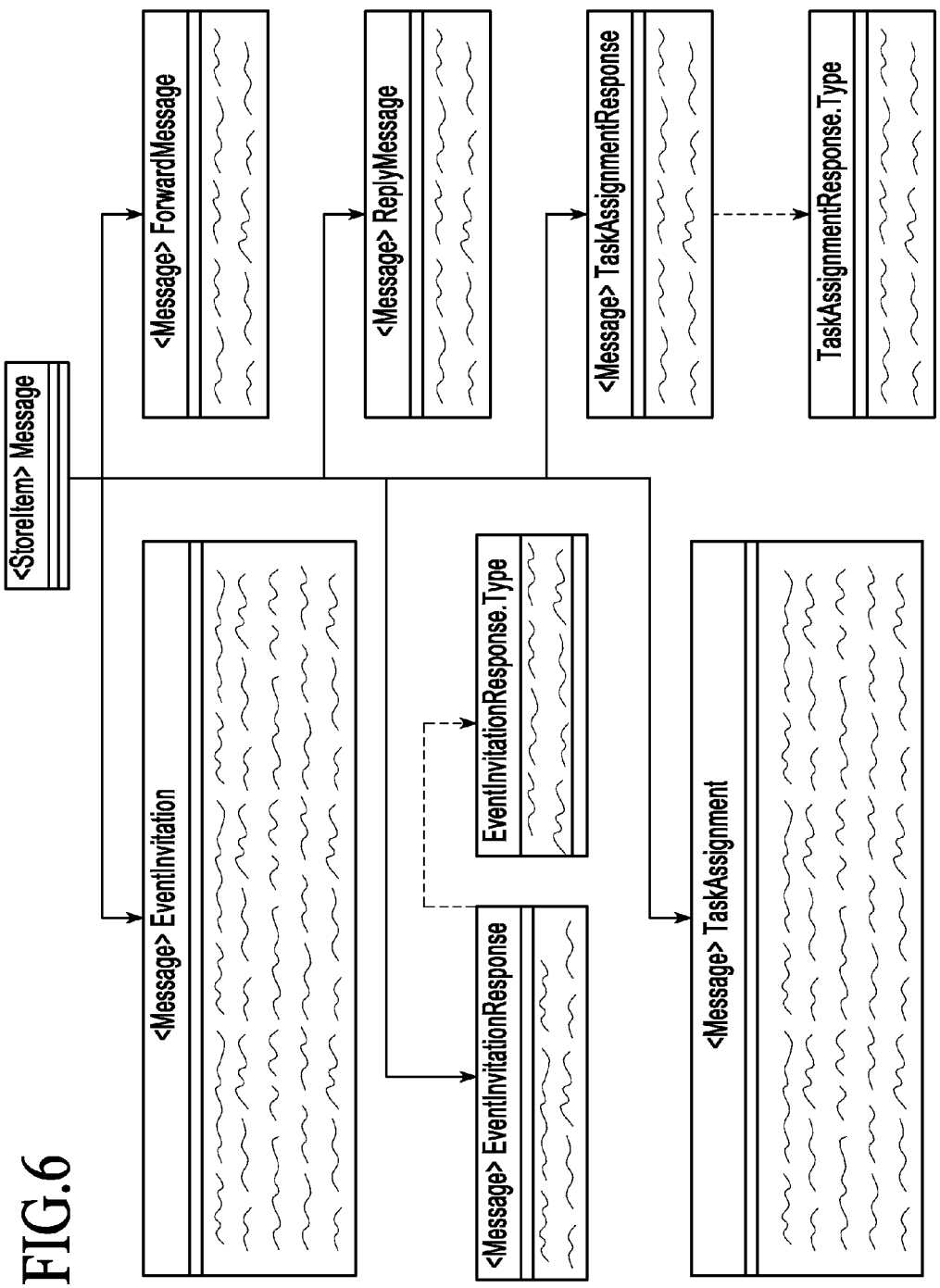
FIG. 6 is a UML diagram representing the message subclasses in a preferred embodiment of the wireless groupware system of a preferred embodiment of the present invention.

The foregoing class definitions can be further understood by reference to the UML diagrams of FIGS. 5 and 6.

Client Server Communication Protocol

The second component of the wireless groupware system is the client-server communication protocol. Two version of a wireless groupware communication protocol have been created. The first protocol, the Simple Inbox Return Format (SIRF), is focused squarely on real-time, session-based wireless groupware, whereas the second, In Sync (NSYNC), is somewhat more abstract, and can support stateless transactions. Both protocols can be used as part of wireless groupware applications and were created to satisfy the following requirements:

A lightweight, efficient means of communicating a variety of data types.

Support for stateful and stateless communication.

Able to support a variety of character encoding formats.

Able to be implemented using a variety of computer programming languages.

Able to be implemented on resourced limited mobile computing devices and high-powered servers alike.

Support for sequential, iterative access to large server-side data items.

Able to communicate the Wireless Groupware Data and Action Class information.

Able to be tunneled through standard internet protocols such as Hypertext Transfer Protocol (HTTP) and Send Mail Transfer Protocol (SMTP).

The SIRF protocol is best understood by reference to the wire protocol specification provided below. The functions defined here represent the email or message functionality only, and not the entire set of groupware objects and actions:

SIRF Protocol Specification

GUIDs are globally unique identifiers, stored as valid ANSI NULL-terminated strings without any CR characters.

Message indexes are UInt32 starting at 0, and ID's are Uint32. The message ID is used only between the client and connector/session. The session will communicate with the providers using separate String message ids.

Server sends responses with DELIM character of 0×06 and terminating with ETX (0×03)

Dates will always be transmitted in the string form "YYYYMMDDHHMM", where Y is Year, M is Month, D is Date, H is Hour, and the second M is Minute, and where months and days are 1-based, and time is 24-hour format. The client and Server will agree upon a number of error and status codes to communicate the following: Success, Authentication Failure, Invalid Account, Invalid Provider, Provider IO Error, Host Not Found, User Not Logged In, Invalid Client Version, Address Resolution Error, Invalid Bound, Invalid Item ID.

| Function Definitions | |
|---|---|
| Function Name | RegisterServer |
| Description | This function allows a device to make itself known to the Secure Server, which will assign a GUID to it. This will be performed as part of the first-time initial setup when a user specifies the location of the Secure Server. If the device does not already have a guid it may leave this parameter blank. |
| Command | action=register&guid=<guid> |
| Response | serverStatCodeDELIMguidDELIMETX |
| Function Name | UpdateAccts |
| Description | This will allow a client to tell the server its account configurations. The server should just refresh it's notion of accounts associated with the passed GUID to match the new list - the client settings always override the server's. Passwords will never be stored on the server as part of an account configuration - just host, username, provider ID, and email address. |

-continued

Function Definitions

| | |
|---|---|
| Command | action=accts&guid=<guid>&num=<numberofAccounts>&data=<num1>DELIM<host1>DELIM<userName1>DELIM<providerName1>DELIM<email1>DELIM<num 2>DELIM<host2>DELIM<userName2>DELIM<providerName2>DELIM<email2>DELIM<numn>DELIM<hostn>DELIM<userNamen>DELIM<providerNamen>DELIM<emailn>DELIM |
| Response | serverStatCodeDELIMDUMMYDELIMETX |
| Function Name | LoginUser |
| Description | Log a user on-to the server. The server should authenticate the user with the configured provider and return the providers supported items.<br>The Client version string is sent at this stage |
| Command | action=login&guid=<guid>&acct=<num>&pw=<pw>&version=<version> |
| Response | serverStatCodeDELIMadminMsgDELIMsessionCookieDELIM0 or 1 (supports Message)DELIMSupported Message ActionsDELIM0 or 1 (supports Event)DELIMSupported EventActionsDELIM0 or 1 (supports Post)DELIMSupported Post ActionsDELIM0 or 1 (supports Task)DELIMSupported Task ActionsDELIM0 or 1 (supports Contact)DELIMSupported Contact ActionsDELIMETX |
| Function Name | LogoffUser |
| Description | Server will log the user off of their current session. |
| Command | action=logoff&guid=<guid>&sid=<sid> |
| Response | serverStatCodeDELIMDUMMYDELIMETX |
| Function Name | GetProviders |
| Description | Get the names of the currently registered providers |
| Command | action=gateways&guid=<guid> |
| Response | serverS atCodeDELIMname1DELIMname2DELIMnamenDELIMETX |
| Function Name | GetMsgs |
| Description | Get message headers from the default location.<br>reset is Boolean indication whether the contents of the server session store should be refilled |
| Command | action=getMsg&guid=<guid>&sid=<sessionCookie>&start=<startDate>&end=<endDate>&sub=<subject>&from=<from>&body=<body>&index<startIndex>&max=<max>&reset=<resetStore> |
| Response | (messages ordered by client-accessible "index")<br>ServerStatCodeDELIMnumTotalMessagesDELIMserverIndex1DELIMmessagetype1 (0=Message, 1=EventInvitation)DELIMshortsubject1DELIMfromDisplay1DELIMfromEmail1DELIMshortDate1DELIMserverIndexnDELIMmessagetypen(0=Message, 1=EventInvitation)DELIMshortsubjectnDELIMfromDisplaynDELIMfromEmailnDELIMshortDatenDELIMisLastAvailable(0=more messages available, 1=last set of messages available)DELIMETX |
| Function Name | GetFullMessage |
| Description | Retrieve a full message |
| Command | action=message&guid=<guid>&sid<sessionCookie>&index=<msgIndex>&start=<firstByteOfBodyToSendBack> |
| Response | ServerStatCodeDELIMfromEmailDELIMtoEmail(s)DELIMccEmail(s)DELIMallowReplyAll(0=all recipients included, 1=reply all should be disable because all recipients were not transmitted to client)DELIMsubjectDELIMlongDateDELIMtotalBodyBytesDELIMbytesSentNowDELIMbodyDELIMattachment1NameDELIMattachment2NameDELIM . . . ETX |

-continued

Function Definitions

| | |
|---|---|
| Function Name | Send EMail |
| Description | Sends an email with the specified parameters |
| Command | Post body: action=sendEmail&guid=<guid>&sid<sessionCookie>&msgType=<type SEND_TYPE 0, REPLY_TYPE 1, REPLY_WITH_TEXT_TYPE 2,FORWARD_TYPE 3 >&relatedMessageIndex=<related message, such as in reply to>&to=<to (';' delimited)>&cc=<cc (';' delimited)>&sub=<sub>&body=<body> |
| Response | serverStatCodeDELIMDUMMYDELIMETX<br>or if one or more names were not resolved<br>ServerStatCodeDELIMname1\n<br>name2\n<br>namen\nDELIMETX |
| Function Name | DeleteMessages |
| Description | Deletes the messages specified by the passed IDs. |
| Command | action=delMsgs&guid=<guid>&sid=<sessionCookie>&num=<numToDelete>&ids=<ID1>DELIM<ID2>DELIM<IDn> |
| Response | ServerStatCodeDELIMDUMMYDELIMETX |

Exemplary Implementation

Figure 7:
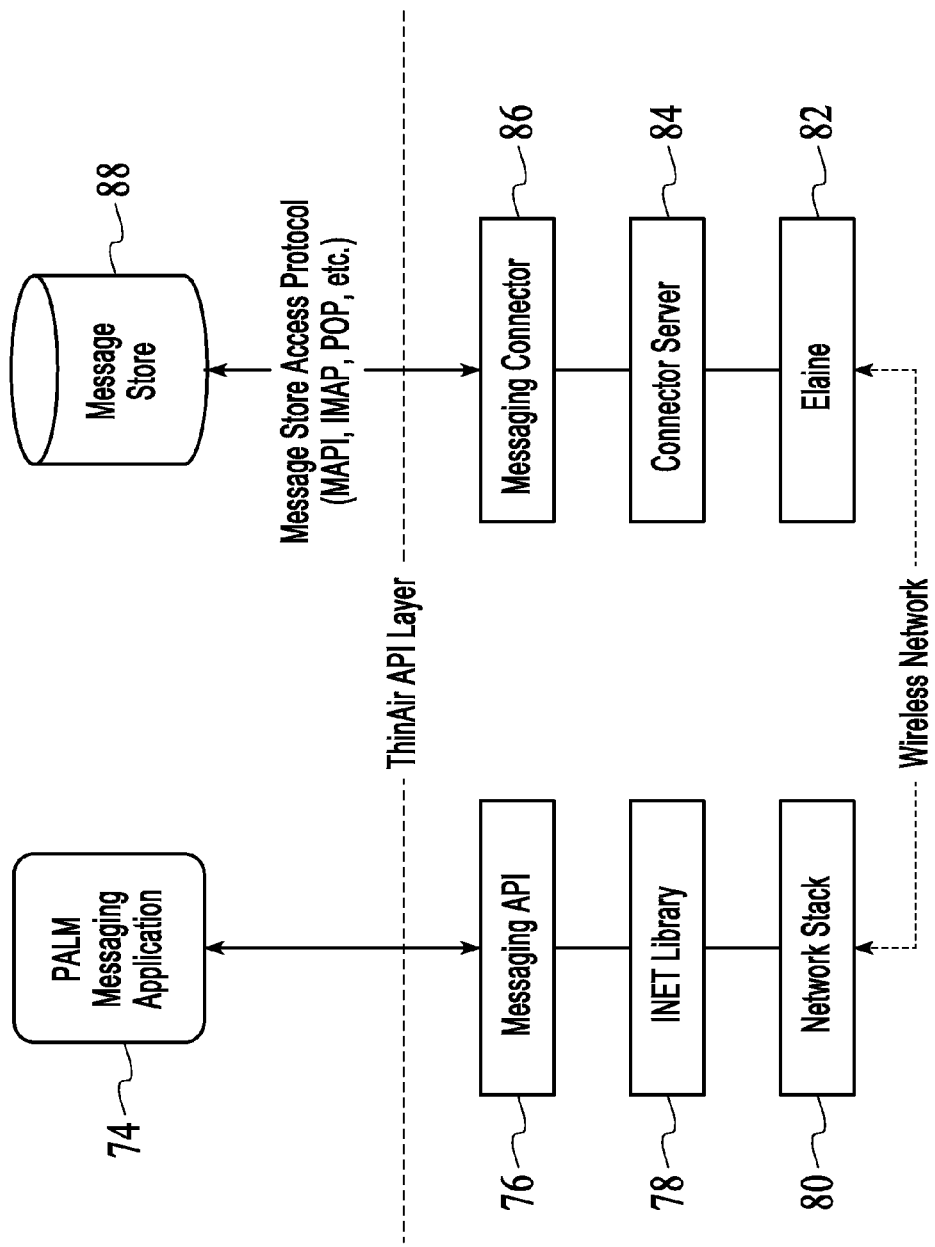
FIG. 7 is a block diagram representing the communication protocol for an implementation of the present invention.

In an exemplary embodiment, the "API" is a set of routines that the Connector 52, FIG. 1, routes from a Client device through to the session management layers. The specific routines will be proxied to the abstract for communication with the Providers underneath As shown in FIG. 7, in a Palm Client implementation where a Palm Messaging Application 74 running on a Palm device is being supported, the API functions will be available in the Client device to higher application layers. The Messaging API software 76, which is the client side of the server software, the Inet Library 78, which controls the Palm hardware for sending data, and the Network Stack 80, which is the lower level portion of the Inet software, all run on the Palm device. Communication of the Palm device to the Connector Server 84 is through a wireless connection to the Palm wireless gateway, i.e., Elaine 82. The Connector Server 84 communicates to the Message Store 88 through the Messaging Connector 86 which may also have as part of it a Provider as described above.

The Messaging Connector 86 will communicate over HTTP with the Client device (HTTPS on the Palm VII) using the SIRF communcation protocol. All content in this communication must be marked as HTML, even though it will not be, in order for the Palm.net proxy server to pass it through to the Client device. The Palm Connector 52 will communicate with the Client device and process the requests accordingly to produce the desired response to fulfill the needs of the Messaging Application 74.

NSYNC Protocol (Client Server Protocol, Version 2)

In the NSYNC protocol, the framework is designed to allow developers to leverage application-level logical steps in building cross-platform client-server wireless applications. All details of transport layer implementations, push or pull, synchronous or asynchronous communication protocols can be hidden from the level at which the application developer operates. The NSYNC framework is a straightforward division of labor between various layers of an application, where the application consists of client and server components operating transparently together. Other levels of abstraction can be built on this basic framework to accomplish more and more general tasks with less specific coding, with an attendant decrease in performance.

Actions

The framework is based on the fundamental notions of Actions. Actions are application-level tasks that are typically reflected directly to a user. The Actions are implemented as classes in whatever object-oriented language we are discussing. An application, then, rests on the fundamental set of Actions it supports. An e-mail application, for example, might implement Actions such as Fetch Messages or Delete Messages. The client uses the services of a server supporting this framework to carry out the actual execution of these Actions.

Each and every Action implies a corresponding Action Response. These are the results of an Action, and every Action has EXACTLY one Action Response. Actions are fed to the server via a Request, which contains a set of Actions and a MetaData object, some holder for information that spans all Actions in the Request. The server executes all of the Actions in the Request, using whatever appropriate information is contained in the MetaData, and returns a Request filled with Action Responses.

NSYNC Server Architecture

Figure 8:
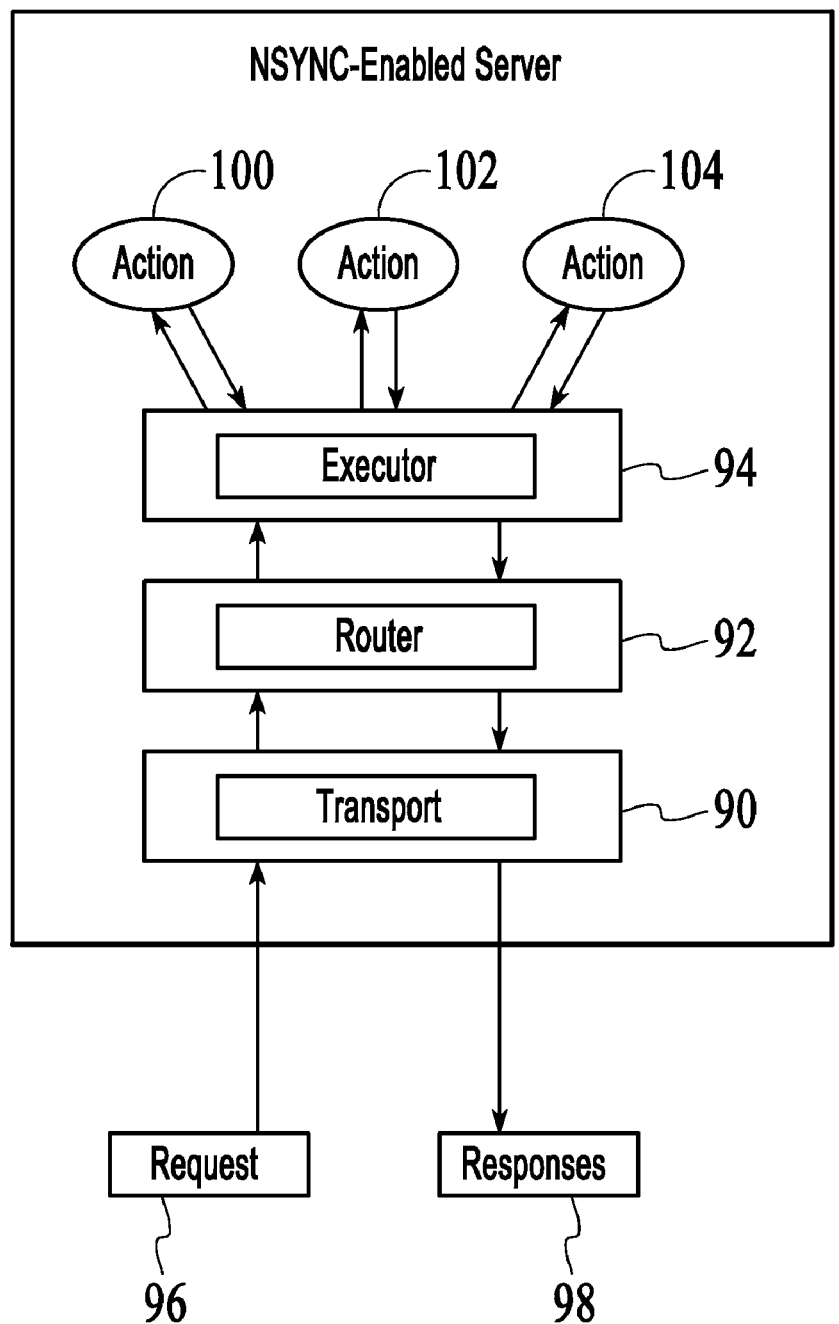
FIG. 8 is a block diagram representation of server communication protocol components for a preferred embodiment of the present invention.

As shown in FIG. 8, the server-side of the framework consists of three distinct functional levels: Transport 90, Router 92, and Executor 94. The Transport component 90 is responsible for receiving Requests 96 over some transport layer, and returning Responses 98 back over that layer. The Router 92 is responsible for maintaining resource pools, and offering services to the Transport 90 to identify incoming Actions 100–104. The Transport 90 assembles the Actions 100–104 using services of the Router 92, then passes them into the Executor 94 for actual execution—the Executor 94 is responsible for actually executing the Actions 100–104 contained in the Request 96 and generating Responses 98. The Transport 90 receives the Response 98 from the Executor 94 and sends it back to the client that sent the original Request 96.

Note that these fundamental divisions of labor are quite high-level. The services offered by each layer are quite openly defined, and the stack resembles a network protocol stack more than a concrete definition of services in some particular language.

The Transport

The Transport piece 90 of the architecture could be implemented as a stand alone server application, and could in fact be the execution environment that hosts the framework. Alternatively, the Transport component 90 could be plugged into some other server architecture.

The Transport 90 must know how to interpret incoming Requests 64 and build Actions 100–104 from some network layer protocol. This implies that a Transport implementation has some knowledge of the client-side Transport implementation, as well as various Actions 100–104, Action Responses 98, and MetaData.

The Executor

The Executor 94 is the component that understands how to "execute" Actions 100–104 and generate corresponding Action Responses 98. This implies that it is tied to the Transport 90 to some degree, in that they both have the notion of a set of "supported" Actions, on which they must agree. This does not mean that an Executor 94 and Transport 90 are only usable with a certain predefined set of Actions 100–104. As we will see, this general model can be further specified with a certain type of Action 100–104 that is self-describing and self-executing.

The Router

The Router 92 manages coordination between the Transport 90 and the Executor 94. It allows both components to take advantage of caching and performance-enhancing facilities, and ensures that there is some degree of type-safety between the two layers. The Router 92 is an intermediary, and though implementations may be complex, the definition of services is not.

Example Implementation

Figure 9:
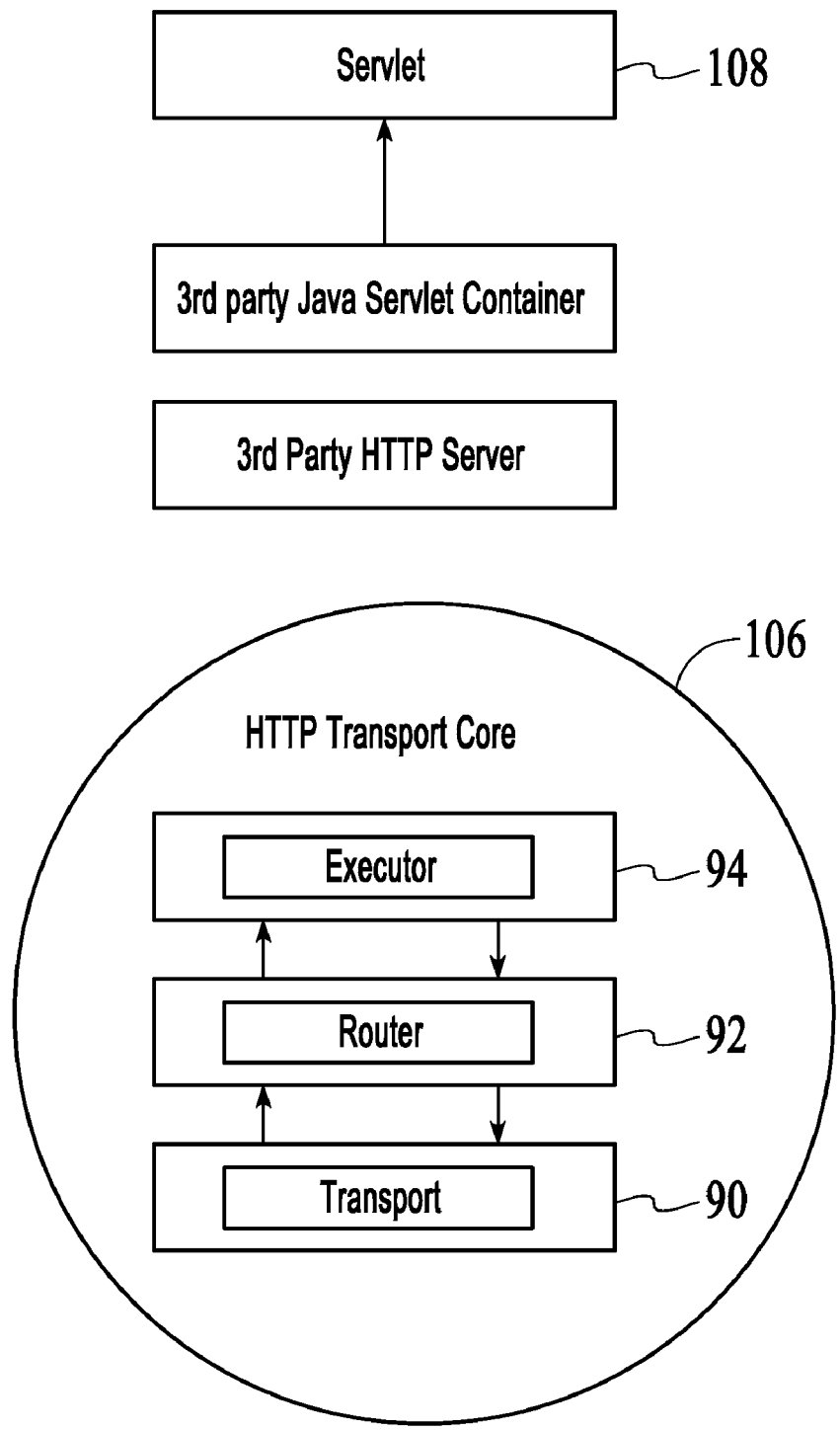
FIG. 9 is a block diagram representation the use of server communication protocol components in a generic Java HTTP server of a preferred embodiment of the present invention.

As we mentioned previously, the framework can be implemented in a number of ways—as a complete server application, or as a component of another server architecture. Let us consider a specific of the NSYNC Java implementation as depicted in FIG. 9. The NSYNC Java implementation provides an HTTP Transport Core component 106. This component hosts the NSYNC framework inside a generic HTTP-server plugin module. The module is designed to take incoming HTTP requests and output HTTP responses, and is the runtime environment for the Router and an Executor. The module includes a Java Servlet API wrapper 108, as well as a Connector wrapper. This implementation therefore provides a way for the framework to operate in several different HTTP server environments transparently.

Groupware Application Workflow

The application workflow for a wireless groupware application will now be described with reference to FIGS. 10A–10H. As used in the workflow diagrams, links bracketed with "<>" indicate on screen links, "( )" indicated on screen custom softkeys, and "[]" indicate off screen static hardkeys. These application workflow diagrams explain how to set up a Wireless Application Protocol (WAP) enabled handset to access e-mail and groupware data. To access the Connector server 30 (FIG. 1), browse to the URL or IP address of the machine in your network where it is installed 110. Once the browser is configured to find the Connector server 112, a welcome screen will appear 114 prompting the user to enter their login information including user name and PIN. At the login screen the Wireless User Name that has been provided by the system administrator is entered 116 along with a Wireless PIN 118. The user name and PIN are confirmed by first checking whether this is a new user profile 120. If it is not a new user profile, the entered PIN will be checked 122 and, if incorrect, a message will delivered to the user that they have entered an invalid user name or password 124. The user can then elect to reenter the user name 116 and PIN 118.

If the user name and PIN that have been entered are new 120, the system will check to ensure that the user name is not blank 126 and that the password is not blank 128. If the user name is blank, the user will be prompted to enter the user name 116. If the PIN is blank, the user will be provided with a message indicating that a password must be entered 130. If the user elects, they will be given the opportunity to enter a PIN 118. Once the user has entered a correct user name and PIN, the Connector server will then check whether the user has an e-mail profile 132.

Account Set Up

The first time a Groupware Access application running on the Connector server is visited by a user, an e-mail account will need to be set up. If the system administrator has not pre-configured an account, the user will be prompted to configure the e-mail account 134. First, the user will be prompted to choose the appropriate type of email/groupware provider 136. Exemplary e-mail/groupware providers include Microsoft Exchange, IMAP, POP, and DOMINO. The internal URL or IP address of the email or groupware server is then entered 138. The server's hostname can be obtained from the administrator if the user does not know it. The user login name for the groupware server is then entered 140 and the user is given the option of entering the password 142. If the user does not enter the password, they will be asked to enter it at each logon. Depending on the security configuration of the Connector server, the user may not have the option to save the password as part of account configuration.

The user will then be prompted to enter their Display Name 144. The Display Name is the name that will be used when messages are sent by the user using the Connector server. The Display Name field is not required for Microsoft Exchange or Lotus Domino accounts. The user will then be prompted to enter the complete e-mail address 146. This is the return e-mail address that will be used when messages are sent with the connector server. This field is not required for Microsoft Exchange or Lotus Domino accounts. The setup is then complete and the user will be provided with a message indicating that the e-mail account has been successfully configured 148. The user is then returned to the Mailbox Manager at the login screen 112.

Mailbox Manager

The Mailbox Manager allows a user to logon to a particular mailbox that has been configured. When logging in, the user will be presented with a list of the available mailboxes. To sign in to a mailbox, the mailbox is selected from the list and a Sign In button is selected. A search is then performed to determine if the user elected to have the system save the e-mail password for the account 150. If not, the user will be prompted to enter a password for the account 152. If the user attempts to enter a blank password 154, and blank passwords are not accepted by the system, the prompt to enter the password will again be provided to the user 152. If the wrong password is entered 156, the user will be provided with a prompt indicating that the wrong password is entered 158 and the user will be prompted to enter the correct password 152. If the password is saved 150, a blank password is accepted or the correct password is entered 156, the user will be presented with a default view of their mailbox 160, FIG. 10B.

If the mailbox is empty 162, the user will be provided with a message that there are no messages to display 164 and the user will be given the option of returning to the main menu or back to the previous screen. If the mailbox is not empty the default view of the mailbox 160 will be displayed.

The default view screen will contain a list of headers for the five most recently received messages. The default screen will also provide the user with the options of viewing messages, browsing through the list of headers, searching for a mail message, refreshing the screen (to display headers for newly received messages. From the default view screen 160, the user can browse through the list of message headers in the mailbox by selecting an option to view More 166. The user will then be provided with a list of the next five message headers.

To refresh the default screen, the user selects the Refresh option in the default view screen 168. If the user ever desires to back up a screen, the user would select the Previous option in the view screen 170. Alternatively, the user can select to go Back 172 which will return them to the previous screen if they are not already on the first screen. If they are already on the first screen, they will be returned to the Main Menu, to be described below. The user can also go to the Main Menu by selecting the Menu option on the view screen.

If the user would like to view the contents of a message, they would select the header of the message to view. Messages received in the mailbox can be standard e-mail or invitations. Thus, when a header is selected the system will first determine whether the selected message is an invitation or an e-mail 174. If it is an invitation, the details of the invitation will be displayed including the sender, title, location, time 176. The user is then presented with the options of accepting the invitation, declining the invitation, or tentatively accepting. The user can then select the response option desired and this will be sent to the invitation sender 178. Rather than selecting a response, the user can also select to return to the message list thereby putting off the response.

If the message selected to be viewed by the user is an e-mail, the user will be provided with a default view of the e-mail including the From, Date, and Subject fields as well as the body 180. The options More, Reply, Reply All, Forward, Delete, and OK are also presented to the user. The message contents are sent in one kilobyte chunks so only a portion of the message may be displayed in the default view. To view additional one kilobyte chunks of the message, the user would select the option for More.

If the user selects the OK option when in a message, they will be returned to the previous screen or, if already at the first screen of a message, they will be returned to the message list. The user is also provided with the Back option which will return them to the Message list from wherever they are in a message.

If the user selects the delete option, the message will be deleted and the user will be provided with a message indicating that the message has been deleted 190. The user can confirm this by selecting OK following which they will be returned to the message list. Alternatively, they can select back which will undue the delete and return them to the body of the message.

If the user selects the Reply, Reply All, or Forward options, they will be provided with prompts for entering the recipients, cc's, Subject and Body of the response message 184. At each prompt, the user can enter the data or select back to back up and change the entered data. Once all of the requisite data has been entered, the user selects the send option and, if the recipient list matches with the original message 186, the message is sent and the user is informed of this 188.

If the user is at the first prompt of the response message 184, the recipient prompt, and selects back, they will be given the option of selecting the type of item they wish to compose 190. If the user desires to compose a response message they will be returned to the response prompts and follow the steps described above. If they instead desire to compose a calendar entry they will select this option and be returned to the Main Menu.

From the message list 160, the user can also select to Search their messages. Using this option, the user can search through their entire inbox based upon search criteria set for the From, Subject and Body fields of the e-mail 192. If the search criteria for one of the fields is left blank, that field will not be used as part of the search. If all of the fields are left blank the user will return to the message list. If not, once the search is complete if messages are found that match the search criteria 196, the user will se a list of messages that match the criteria entered 198. The messages found by the search can be viewed by selecting the header of the desired message. The list of found messages can be navigated and manipulated in the same way the message list is as described above.

If no messages match the search criteria 196, a message will be provided to the user informing them of this and giving them the option of going Back to select new search criteria or returning to the Main Menu 200.

Calendars

As depicted in FIG. 10C, the user has the option of accessing their groupware calendar using their wireless device. When the user enters the Calendar application the server will determine if the calendar is empty 202 and, if so, deliver a message to the user that there are no calendar items to display 204. The user can then choose to go back or return to the Main Menu. If the calendar is not empty 202, the most current calendar item will be provided to the user 206 along with the options View, More, OK and Menu.

The OK option returns the user to the previous screen or, if it is already at the first screen, to the Main Menu 208. The Menu option returns the user directly to the Main Menu 210. Because of the limited screen dimensions of the wireless device, only a limited number of calendar event headers can be displayed at a time. The More option allows the user to view additional calendar events not currently displayed. If there are no additional calendar events to view 212, the user will be provided with a message to that effect 214 and the user can go back or return to the Main Menu.

If the user selects the view option for a calendar item they will be provided with additional information about the calendar item including the Organizer, Title, Location, time and attendees 216. The user can then select to leave the view screen and go back to the calendar list by selecting back.

Notes

Also depicted in FIG. 10C is the flowchart for use of the Notes application provided by the Connector Server 218. As will be described below, to view notes a user would select notes from the Main Menu. If the Notes folder is empty 220 the user will be provided with a message to this effect and be given the option of returning to the Main Menu 222. If there are Notes 220, the default view of the list of the first five notes will be provided to the user 224. The details of any of the Notes in the list can be viewed by selecting the note from the list 226. As with the Calendar application, the More, OK, and Menu functions are also provided in the Notes application.

Logoff

To logoff the Connector Server, the user would return to the Main Menu from any of the applications and then select the logoff option. A message would be provided to the user indicating that they are logged off of the server 228. The user would be given the option here of logging back into the server or going back to the Main Menu. While the user can return to the Main Menu they will be logged off the server but will be able to retrieve data already downloaded to their wireless access device. If the user does not log off on their own, they will be automatically logged off after the session idle time limit has been reached. The session idle time can be configured by the system administrator.

Contacts List

Another option available from the Main Menu is the Contacts List application. This application allows a user to access contact lists stored on the connector server. For Microsoft Exchange it is Contacts, for Lotus Domino it would be People. When this option is selected the server will determine first if there are any contacts in the user's list 230. If not, the user will be provided with a message to this effect and be returned to the previous screen or Main Menu at their option 232. If there are contacts in the user's list, a default display of the first five contact's full names are displayed along with the View, More, Search, OK and Menu options 234.

To view a contact's information, the user would click on the contact's name. The server would then make a determination whether the file for the contact information is too large to be sent to the wireless device 236. If the file is too large, the user will be notified of this and given the option to return to the previous screen 238. If the file is not too large to be sent to the wireless device, it will be sent and the contact's data displayed 240. The use will then have the options of directly placing a call to the contact or composing an e-mail to the contact.

As previously described, the More option allows additional contacts to be displayed. Also, the OK and Menu options provide the functions previously described.

The Search option permits the user to search for a contact by entering the contact's name 242. If a search by name is performed, the server will return the contact's information 246 or let the user know that no contact has been found with that name 244. If no contact is found with the searched name, or if no search criteria are entered, the user is returned to the search query screen to enter a name 242.

Compose Menu

To create a new mail message or a new calendar item the user selects the Compose option from the Main Menu. The user is then prompted to select the type of item they wish to compose, e.g., a mail message or a calendar item 248. If the user selects to compose a mail message, they are then presented with the prompts to enter the recipients e-mail address, any cc's e-mail addresses, a subject line and the body of the message 250. The user then clicks on send to send the message.

If the user has entered a recipient e-mail address 252, the message will be sent and the user will be notified of this by a message displayed on their wireless device 254. If the recipient list is blank 252 the user will be returned to the prompt to enter an e-mail address for the recipient. It should be understood that recipient's e-mail addresses can be stored in memory of the server or wireless device so that the user may need to enter only the recipient's name in the to line and the server or device will provide the necessary e-mail address. After sending the e-mail, the user will be given the option to go back to prepare additional e-mails or go to the Main Menu.

If the user selects to compose a calendar item the user will be prompted to enter the attendees, title, location, start time, end time and details of the calendar item and then click on create 256. The server will check to see if all of the attendees are recognized 258 and if any of the attendees are incorrect an error message will be presented to the user requesting that the user go back and edit the attendees list 260. If all of the attendees are correct the server will then check to ensure that the start time is before the end time for the item 262. If the start time is before the end time the calendar entry will be added to the calendar 264 and the user will then be given the option of going back to create more calendar items or return to the Main Menu.

If the start time is after the end time 262, the user will be notified that they are attempting to create a calendar item with invalid parameters. The user will then go back to edit their calendar item.

Main Menu

The Main Menu screen, as depicted in FIG. 10F, provides the user with the various applications available through the connector server. After login to the server, the user is presented with the Main Menu screen which presents the options of Messages (described above), Calendar, Contacts, Tasks, Notes, Compose, Browse Folders, Logoff, Setup and OK 268. By selecting the desired option in the Main Menu the desired application is launched.

Task List

To view tasks the user would select the Tasks from the Main Menu (Tasks for Microsoft Exchange To Dos for Lotus Domino). The default view of the first five task notes is presented to the user 270 along with the options of View, More, OK and Menu. If the task list is empty 272 the user will be presented with a message that there are no items to display 274 and can then return to the Main Menu or go back to the previous screen.

If the user wishes to see more than the first five tasks, the select the More option and if there are more tasks to display 276 the next five items will be displayed. If there are no additional items to display the user will be provided a message that there are no items to display 278 and given the option of going back to the previous screen or returning to the Main Menu.

If the user desires to see the details of a task they would click on the task in the list 270. The server would then check to determine whether the message is too large to display 280 on the wireless device. If the task note is too large to display, the user will be provided with a message indicating that the message is too large 282 and the user will be returned to the task list. If the message is not too large to display the task note including the Title, assigned date and time, due date and time, priority (low, normal, and high), percentage complete, and details 284. After reviewing the task list, the user can then return to the task list.

Browse Folders

The user can also view messages that are stored in folders other than the inbox. To view such messages the user selects the Browse Folders option from the Main Menu. The user is then presented with a message requesting the user select the type of message to view, e.g., Messages, Calendar, Contacts, Tasks, Notes, Deleted Items, and Outbox 286. In a preferred embodiment, only the first five available folders are provided in the default screen. The user would select the More option to view additional folders. To view the contents of a folder, or to see a folders subfolders, the user clicks on the folder and the folder contents or folder's subfolders will be displayed 288. Be selecting the back option the user will be sent back to the previous screen or, if at the first screen 290, the user will go back to the Browse Folders menu.

Setup Menu

The Mailbox Manager can also be used to create, edit, or delete a mailbox configuration or to change the Wireless PIN. To perform any of these functions, the user selects the Setup option in the Main Menu 292, FIG. 10H. To add a new mailbox, the user then selects an Add New option in the Mailbox Manager and is provided a message requesting that information be provided to set up the account 294. The user is then prompted to enter an access provider, server, login name, password, display name, and e-mail address 296. If the user enters the requested information, they will be provided a message indicating that they have successfully configured the e-mail account 298.

To edit the PIN for the account, the user selects the password option in the setup menu 292. The user is then presented with a message asking if the user would like to change the password 298. If the user responds affirmatively they are presented with prompts to enter the user name, the old PIN, the old PIN again to confirm it and then the new PIN 302. If the correct username and old PIN were entered 304 the PIN is changed and the user is returned to the Main Menu. If the entered username or PIN are incorrect, the user is presented with a message indicating that the incorrect information was entered 306 and the user is returned to the prompt for entering the user name and old and new PINs 302.

If the user desires to change the user name, they would select the user name option in the setup menu 292. The user is then presented with a message asking if they wish to associate the device they are using with a different user name 308. If they respond affirmatively to this message, the user will be prompted to enter the user name and PIN 310. If the user name is left blank 312 the user will be asked to enter the login information again 314. If an invalid password is entered 316 the user will be presented with a message indicating that the user name or PIN were invalid 318. If either the user name is blank or an invalid user name or PIN are entered, the user is returned to the prompts for entering the user name and PIN.

From the setup menu, if the user selects the menu option, the user will be sent to the Main Menu if they are already logged in 320. If they are not already logged in 320, the user is provided a message indicating that the provider could not be found and the user can then be sent to the login screen 322.

What is claimed is:

1. A method for communicating wireless data, wherein the method comprises:

receiving a request originating from a wireless device to provide data to the wireless device across a wireless network;

identifying a type of wireless device from which the request originated;

selecting a device profile from among a plurality of device profiles, wherein each device profile corresponds to a different type of wireless device;

generating, subsequent to receiving the request from the wireless device, a response to the request for data, the response including renderable data that is configured for one or more characteristics of the identified wireless device; and, transmitting the response across a wireless medium to the requesting wireless device.

2. The method of claim 1, wherein receiving a request includes receiving the request for real-time data provided from groupware.

3. The method of claim 2, wherein receiving the request for real-time data provided from a groupware includes receiving a request for an application selected from a group of applications consisting of (i) an enterprise messaging application or set of applications, (ii) a shared calendar application, (iii) a shared contact application or list, (iv) a shared task application or list, and (v) combinations thereof.

4. The method of claim 1, wherein receiving the request for data includes receiving the request for at least one message.

5. The method of claim 4, wherein the at least one message includes an instant message.

6. The method of claim 1, wherein identifying a type of wireless device includes identifying one or more of a (i) manufacturer of the device, and (ii) a browser type of the device.

7. The method of claim 1, further comprising deriving from the select device profile information about characteristics of a display of the wireless device.

8. The method of claim 7, further comprising deriving from the select device profile one or more of (i) information about a dimension of the display, and (ii) information about any soft keys carried on the display of the device.

9. The method according to claim 1, wherein the received request is received at a connector server, the method further comprising updating the connector server with status information.

10. The method according to claim 1, wherein the received request is received at a connecter server, the method further comprising encrypting received data.

11. A system for providing data to a wireless device, wherein the system comprises:

a server component that is configured to receive a request for data from a wireless device;

a plurality of device profiles corresponding to a plurality of wireless device types;

a profile selector for selecting a device profile corresponding to a particular device type of the requesting wireless device;

one or more processes that generate a response to the request from the wireless device, the one or more processes being configured to generate the response subsequent to receipt of a request for data from the wireless device, and according to a device profile corresponding to the requesting wireless device; and, a transmission component for transmitting the response across a wireless network to the wireless device.

12. The system of claim 11, wherein the server component is configured to handle requests that include requests for real-time data provided from a groupware.

13. The system of claim 11, wherein the request for data includes a request for retrieving at least one message.

14. The system of claim 13, wherein the request for retrieving at least one message includes a request for retrieving an instant message.

15. The system of claim 11, further comprising a module configured to detect one or more characteristics about the given device that include (i) a manufacturer of the device, and (ii) a browser type of the device.

16. The system of claim 11, further comprising device objects that provide information relating to characteristics about a display of the given device.

17. The system of claim 16, wherein the characteristics about the display of the device include a height and width of the display in pixels.

18. The system of claim 16, wherein the characteristics about the display of the device include soft keys carried on the display of the given device.

19. The system of claim 11, wherein the one or more processes further includes a process to automatically detect one or more characteristics about the given wireless device.

20. The system of claim 11, wherein the request from the given wireless device includes a request for execution of an application selected from a group of applications consisting of (i) an enterprise messaging application or set of applications, (ii) a shared calendar application, (iii) a shared contact application or list (iv) a shared task application or list, and (v) combinations thereof.

21. A system for exchanging wireless data according to claim 11, further comprising an encryption means for encrypting data received from a wireless source.

22. A system for exchanging wireless data according to claim 11, further comprising an object generator for generating a device object from the device profile.

* * * * *

UNITED STATES PATENT AND TRADEMARK OFFICE
CERTIFICATE OF CORRECTION

PATENT NO. : 7,092,998 B2 Page 1 of 1
APPLICATION NO. : 09/759204
DATED : August 15, 2006
INVENTOR(S) : Nathanial X. Freitas et al.

It is certified that error appears in the above-identified patent and that said Letters Patent is hereby corrected as shown below:

On the Title Page, Inventors:

Change
"(75) Inventors:  Nathanial X. Frietas, Brooklyn, NY (US);
Shane Connely, Hoboken, NJ (US);
Will Meyer, New York, NY (US);
Jonathan Oakes, New York, NY (US);
James Venturi, New York, NY (US)"
to
--(75) Inventors:  Nathanial X. Freitas, Brooklyn, NY (US);
Shane Conneely, Hoboken, NJ (US);
Will Meyer, New York, NY (US);
Jonathan Oakes, New York, NY (US);
James Venturi, New York, NY (US)--

Signed and Sealed this

Twenty-sixth Day of January, 2010

David J. Kappos
*Director of the United States Patent and Trademark Office*